(12) United States Patent
Heller

(10) Patent No.: US 11,254,590 B2
(45) Date of Patent: Feb. 22, 2022

(54) SYSTEM AND METHOD FOR A HASH TABLE AND DATA STORAGE AND ACCESS USING THE SAME

(71) Applicant: 2Misses Corporation, Dike, TX (US)

(72) Inventor: Steve Heller, Dike, TX (US)

(73) Assignee: 2MISSES CORPORATION, Dike, TX (US)

(*) Notice: Subject to any disclaimer, the term of this patent is extended or adjusted under 35 U.S.C. 154(b) by 0 days.

(21) Appl. No.: 17/293,974

(22) PCT Filed: Feb. 9, 2021

(86) PCT No.: PCT/US2021/017253
§ 371 (c)(1),
(2) Date: May 14, 2021

(87) PCT Pub. No.: WO2021/163055
PCT Pub. Date: Aug. 19, 2021

(65) Prior Publication Data
US 2021/0311992 A1 Oct. 7, 2021

Related U.S. Application Data

(60) Provisional application No. 63/205,633, filed on Feb. 10, 2020.

(51) Int. Cl.
| | |
|---|---|
| *G06F 16/00* | (2019.01) |
| *C02F 1/44* | (2006.01) |
| *C02F 1/469* | (2006.01) |
| *G06F 16/903* | (2019.01) |
| *G06F 16/9038* | (2019.01) |
| *G06F 16/901* | (2019.01) |
| *G06F 16/9035* | (2019.01) |

(Continued)

(52) U.S. Cl.
CPC .............. *C02F 1/441* (2013.01); *B01D 61/58* (2013.01); *C02F 1/442* (2013.01); *C02F 1/445* (2013.01); *C02F 1/4695* (2013.01); *G06F 16/9014* (2019.01); *G06F 16/9035* (2019.01); *G06F 16/9038* (2019.01); *G06F 16/90335* (2019.01); *B01D 61/002* (2013.01);
(Continued)

(58) Field of Classification Search
CPC ................................................... G06F 16/9014
See application file for complete search history.

(56) References Cited

U.S. PATENT DOCUMENTS

| | | | |
|---|---|---|---|
| 7,058,639 B1 | 6/2006 | Chatterjee et al. | |
| 2009/0019345 A1* | 1/2009 | Kaufman | H03M 13/096 714/807 |

(Continued)

OTHER PUBLICATIONS

International Search Report and Written Opinion dated Apr. 28, 2021 in International Application PCT/US2021/017253.

(Continued)

*Primary Examiner* — Ajith Jacob
(74) *Attorney, Agent, or Firm* — Venable LLP

(57) ABSTRACT

The present teaching relates to method, system, medium, and implementations for storage management. A hash table is constructed, having an index file having one or more slots, each of which includes one or more buckets. Each bucket stores one or more types of records, including a direct record, an indirect record, and a forwarding record. A direct record stores data directly in a bucket of a slot of the index file. When a storage request is received related to some relevant data, the request is handled based on the constructed hash table.

12 Claims, 27 Drawing Sheets

(51) Int. Cl.
*B01D 61/58* (2006.01)
*B01D 61/00* (2006.01)
*B01D 61/02* (2006.01)

(52) U.S. Cl.
CPC .......... *B01D 61/025* (2013.01); *B01D 61/027* (2013.01); *B01D 2311/25* (2013.01); *B01D 2317/025* (2013.01); *B01D 2317/06* (2013.01); *B01D 2319/06* (2013.01); *C02F 2209/03* (2013.01)

(56) References Cited

U.S. PATENT DOCUMENTS

| | | |
|---|---|---|
| 2011/0252216 A1 | 10/2011 | Ylonen et al. |
| 2014/0309944 A1 | 10/2014 | Van Rooyen et al. |
| 2015/0052309 A1 | 2/2015 | Philip et al. |
| 2016/0048332 A1 | 2/2016 | Kimmel et al. |
| 2016/0094539 A1* | 3/2016 | Suresh ................ H04L 63/0272 726/7 |

OTHER PUBLICATIONS

Moohyeon Nam et al., "Write-Optimized Dynamic Hashing for Persistent Memory," 17th USENIX Conference on File and Storage Technologies (FAST '19), Feb. 28, 2019.

Mikkel Thorup, "String Hashing for Linear Probing," SODA '09, Proceedings of the Twentieth Annual ACM-SIAM Symposium on Discrete Algorithms, Jan. 2009, pp. 655-664.

* cited by examiner

| BD 510 | R1 520-1 | R2 520-2 | Records 520 ......... | Rm 520-m | EOD 530 |

Fig. 5

| RT 710 | BSH 720 | BN 730 | Length 740 | Offset 750 |

Fig. 7A

| RT 910 | BSH 920 | SBN 930 |
|---|---|---|

Fig. 9A

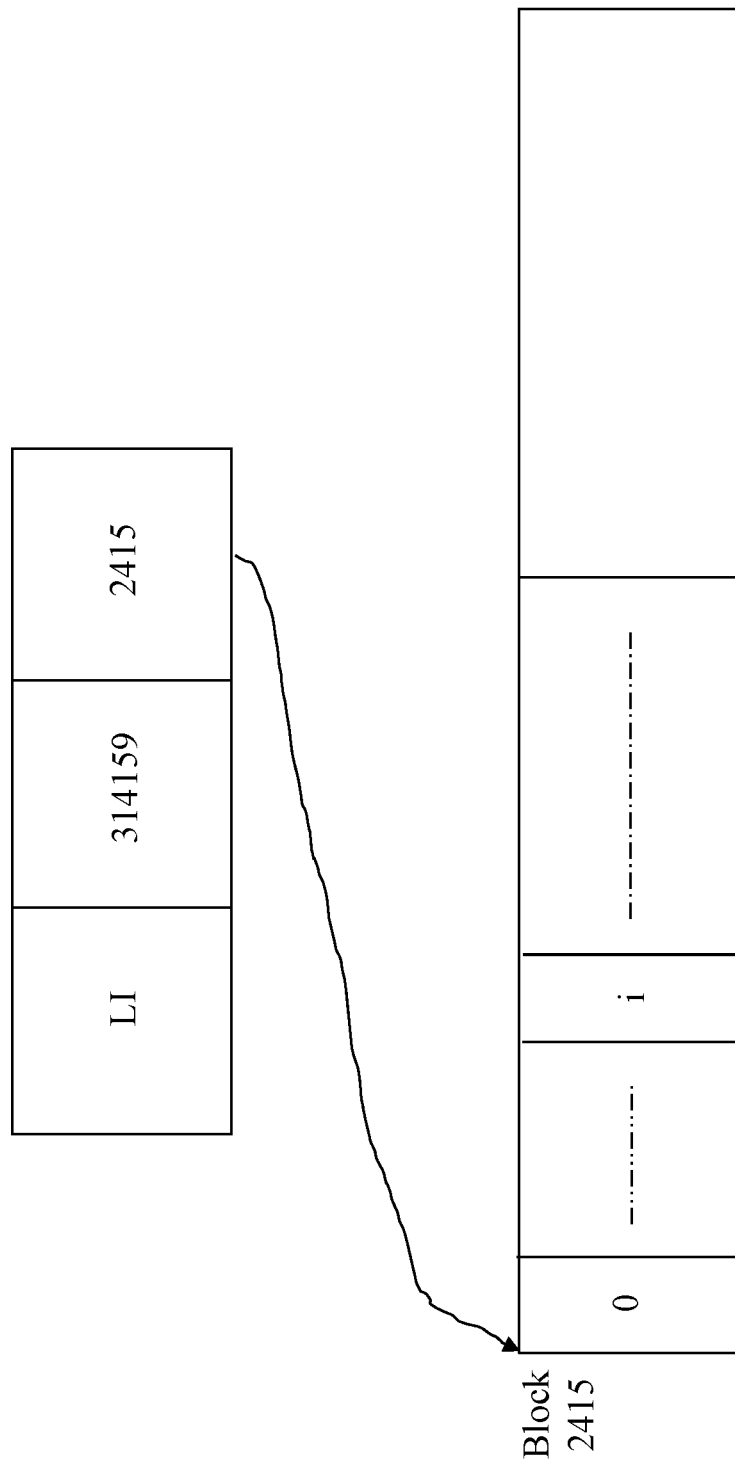

| Slot I 1100 | | | |
|---|---|---|---|
| B1 1100-1 | B1 1100-2 | - - - - - | Bn 1100-n |
| Forwarding Record | Forwarding Record | | Forwarding Record |

Fig. 11A

| RM 1110 | SB# 1120 | BC 1130 |
|---|---|---|

Fig. 11B

|  | B1 | B2 | ... | Bn |
|---|---|---|---|---|
| Si | RM 234 2 | RM 234 2 | ... | RM 234 2 |
| Sk | RM 419 4 | RM 419 4 | ... | RM 419 4 |

| | B1 | B2 | ... | B2n-1 | B2n |
|---|---|---|---|---|---|
| RHSi 234 | | | | | |

| | B1 | B2 | ... | B4n-1 | B4n |
|---|---|---|---|---|---|
| RHSk 419 | | | | | |

Fig. 11D

SYSTEM AND METHOD FOR A HASH TABLE AND DATA STORAGE AND ACCESS USING THE SAME

CROSS-REFERENCE TO RELATED APPLICATIONS

The present application is a national stage application, filed under 35 U.S.C. § 371, of International Application PCT/US2021/017253, filed on Feb. 9, 2021, entitled "SYSTEM AND METHOD FOR A HASH TABLE AND DATA STORAGE AND ACCESS USING THE SAME," which claims priority to U.S. Provisional Patent Application 63/205,633, filed Feb. 10, 2020, which incorporated herein by reference in their entireties.

BACKGROUND

Technical Field

The present teaching generally relates to computer storage. More specifically, the present teaching relates to storage management.

Technical Background

Computers or computing devices are ubiquitous today. With such widespread usage of computers or computing devices, various applications for all sorts of tasks have been developed. Such applications process gather data, process data, and present data. As such, the demand for storing, accessing, and updating a variety types of data on different kinds of storage is ever-increasing. Although memories, storage devices, and management methods thereof have also been accordingly developed to meet the demand, there are issues remaining that affect the performance of storage operations and to a certain extent become a bottleneck for various applications running on different types of computers or computing devices, whether such storage operations are carried out locally, in the cloud, distributed, or centrally.

One of the foundational techniques used in storage management is hashing, which has been used for decades in computer industry to enable mapping between data and memory locations where the data are stored to or retrieved from. In general, hashing works in the following manner. Given data subject to a storage operation (either storage or retrieval), a key is computed based on the content of the data to generate a hash code which can be used to locate index information that points to a memory or storage address for the data. A hash table is where a collection of such index information is stored that maps different pieces of data to different locations in the memory or storage.

Different types of hash table have been traditionally used. FIG. 1A illustrates an exemplary open hash table 100. An open hash table may correspond to the simplest form of open hashing. As seen, there are multiple entries in this illustrated open hash table 100 and the second column 110 in each entry of the table defines the head of a linked list. For example, there are two linked lists illustrated in FIG. 1A, namely 120 and 130. All data records that are hashed to a particular entry of the hash table 100 are placed on the linked list associated with that entry. The more data records hashed to the same entry in the hash table, the longer the linked list associated with the entry. Because of the use of a linked list to store the actual records, there are multiple random (at least two) memory or storage accesses in order to reach a data record. In this illustrated example, to access data record with value 9530, two random memory or storage accesses are needed based on linked list 120; while to access data record with value 1057, three random memory or storage accesses are needed based on linked list 130. In general, the more random accesses are needed, the slower the access speed is, and the longer the latency.

FIG. 1B illustrates an exemplary closed hash table 140, which has two columns each of which has a fixed size as shown. Each record in this exemplary closed hash table has two fields, corresponding to the data in the table. Each record with a key value has a home position corresponding to an entry in the closed hash table. The home position is determined based on the underlying hash function. Each entry in the table can store only one value. When there is a collision, i.e., another record is hashed to a home position where another record has been previously hashed or stored, the resolution to the collision is that either the prior record or the new record has to be stored elsewhere based on the collision resolution employed. The same process is also enforced in retrieving a data record. Due to the limited space available to store data records in the table, it is conceivable that a significant fraction of the storage requests have to be resolved via collision resolution, which leads to slow speed and higher latency. In addition, with this closed hash table structure, the space for storing a data record is of equal size for all records, leading to the inability to store variable length records or a significant waste of memory space.

In addition to speed or latency issue, there are other disadvantages with the traditional hash table solutions. A hash table needs to be re-hashed whenever the hash table in its previously created form is no longer suitable because, e.g., it runs out of space during an attempt to add new records to a hash table. Many hash table implementations use a "big-bang" type of rehashing, meaning that when rehashing occurs, it is applied to the entire hash table. This can cause long rehashing delays while adding records, particularly if the hash table holds billions of records.

Furthermore, the data structure of a hash table optimized for DRAM typically relies on pointers that will become invalid if the memory map later has a different base address. This is often the case even during a different run of the same program, because modern operating systems generally assign memory addresses in an arbitrary manner. On top of that, hash table data are typically not compact in memory but stored in numerous locations at arbitrary addresses determined by, e.g., a memory allocator. Such hash tables need to be deserialized on startup and serialized back to storage on exit, further requiring a significant amount of programming effort as well as significant startup and shutdown delays. These problems associated with traditional hash table solutions have become obstacles in today's society where data access is anytime and anywhere and users of computers and computing devices expect instant data access.

Thus, there is a need for an operable hash table design and methods and systems for handling the same that allow more effective solutions to address the shortcomings and challenges of the traditional approaches.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for storage management is disclosed. A hash table is constructed, having an index file having one or more slots, each of which includes one or more buckets. Each bucket stores one or more types of records, including a direct record, an indirect record, and a forwarding record. A direct record stores data directly in a bucket of a slot of the index file. When a storage request is received related to some relevant data, the request is handled based on the constructed hash table.

In a different example, a hash table is disclosed for supporting storage management. The hash table comprises an index file having one or more slots, each of which includes one or more buckets. Each bucket in a slot of the index file stores one or more types of records, including a direct record, an indirect record, and a forwarding record. A direct record stores data directly as direct data in a bucket of a slot in the index file when the data satisfies a first condition.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for storage management. The information, when read by the machine, causes the machine to perform the following steps. A hash table is constructed, having an index file having one or more slots, each of which includes one or more buckets. Each bucket stores one or more types of records, including a direct record, an indirect record, and a forwarding record. A direct record stores data directly in a bucket of a slot of the index file. When a storage request is received related to some relevant data, the request is handled based on the constructed hash table.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 depicts an exemplary structure of a record-containing bucket in a slot of a 3-M hash table, in accordance with an exemplary embodiment of the present teaching;

FIG. 7A depicts an exemplary structure of a short indirect record in a bucket of a slot in a 3-M hash table, in accordance with an exemplary embodiment of the present teaching;

FIG. 9A depicts an exemplary structure of a long indirect record in a bucket of a slot in a 3-M hash table, in accordance with an exemplary embodiment of the present teaching;

FIG. 9B provides an example long indirect record in a bucket of a slot in a 3-M hash table pointing to a block in an overflow file, in accordance with an exemplary embodiment of the present teaching;

FIG. 11A depicts a base slot with a forwarding record in all buckets directing to a rehashed slot, in accordance with an embodiment of the present teaching;

FIG. 11B depicts an exemplary structure of a forwarding record of a base slot in a 3-M hash table, in accordance with an exemplary embodiment of the present teaching;

FIG. 11D provides example slots in a 3-M hash table with some buckets having forwarding information provided therein directing to respective rehashed slots, in accordance with an exemplary embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching aims to address the deficiencies of the current state of data storage management via an improved 3-Misses or 3-M hash table and management thereof to yield improved performance with a reduced number of cache hostile accesses, elimination of serialization/deserialization of a hash table during start-up and exit, and avoidance of storage access disruption due to rehashing an entire hash table all at once. The enhanced performance in these aspects leads to faster start-up, minimized latency in data processing, and continuity in storage management operations. Different aspects of the 3-M hash table are disclosed below with various embodiments. It is understood that such disclosed embodiments are described for illustration instead of limitations.

Figure 1A:
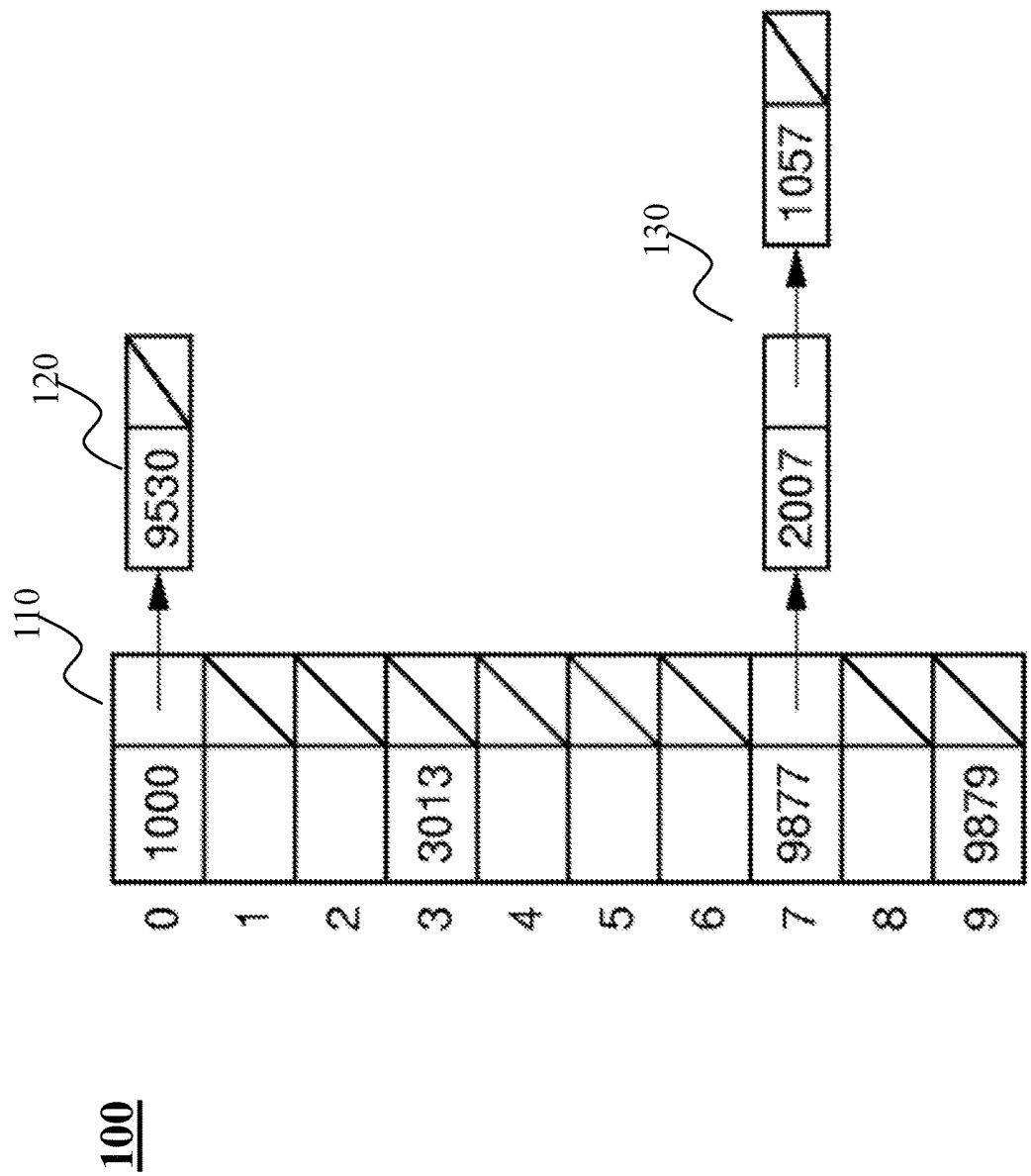
FIG. 1A (PRIOR ART) depicts a traditional open hash table.
Figure 1B:
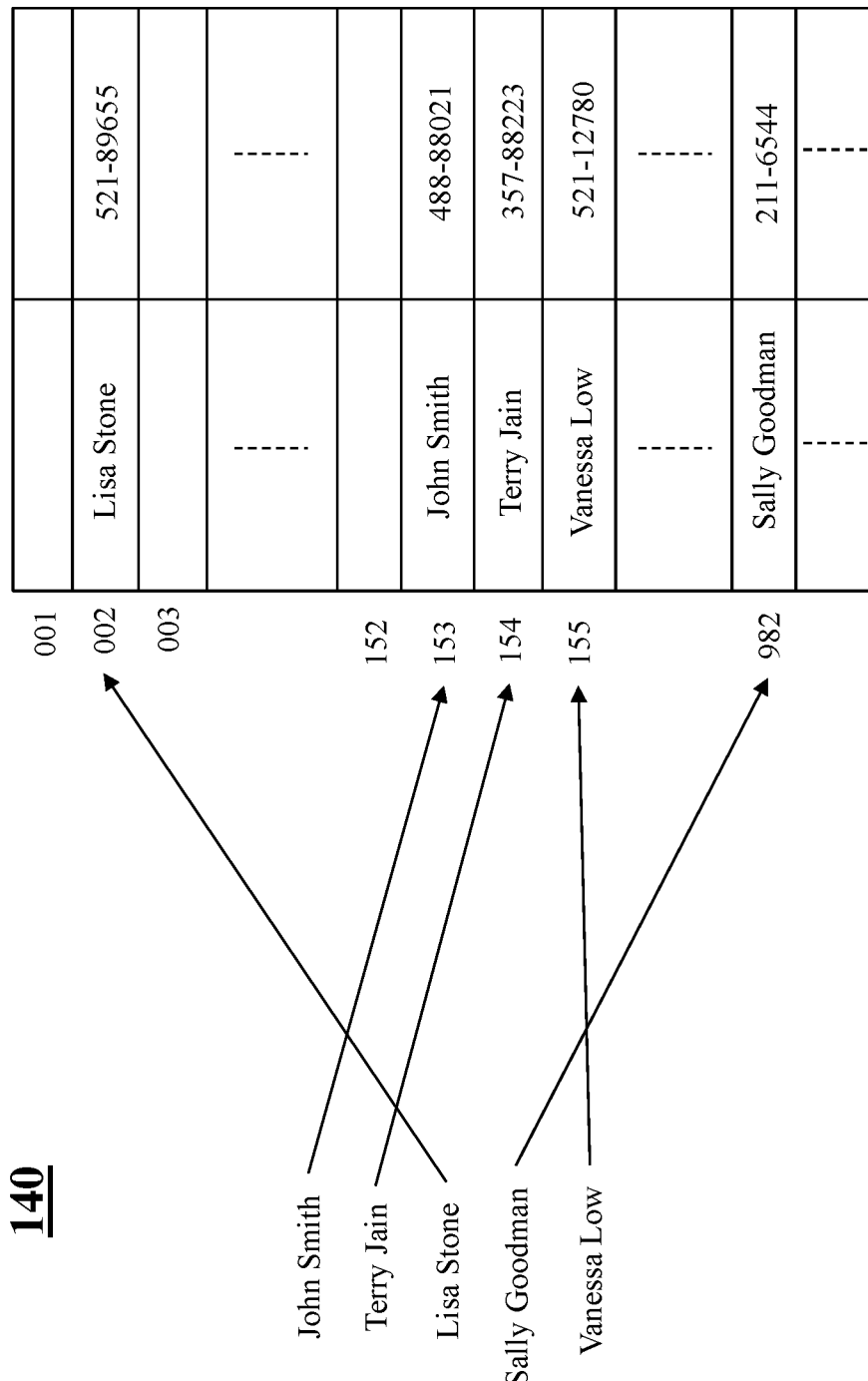
FIG. 1B (PRIOR ART) depicts a traditional closed hash table.
Figure 2:
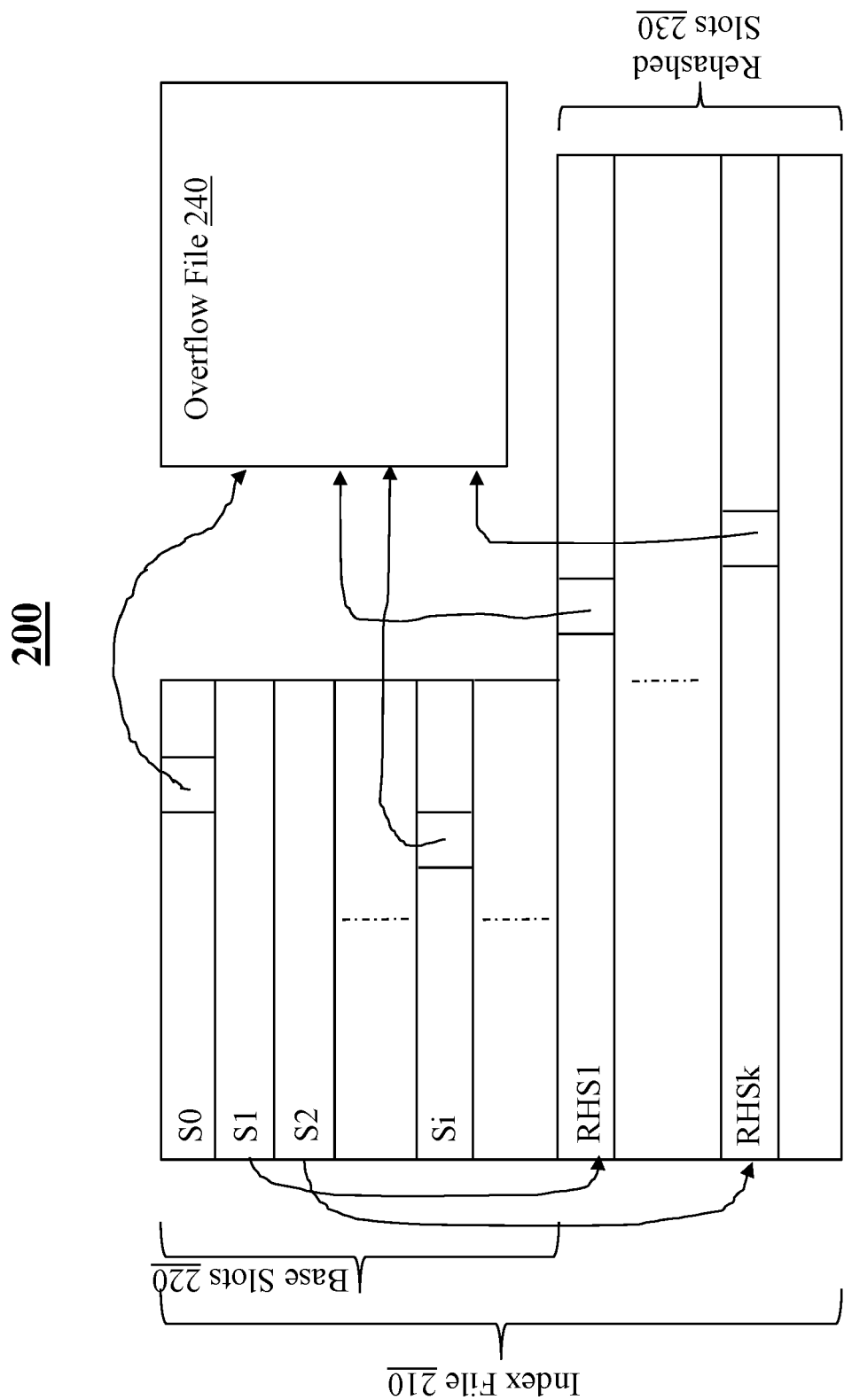
FIG. 2 depicts an exemplary structure of a 3-Misses (3-M) hash table, in accordance with an exemplary embodiment of the present teaching.

FIG. 2 depicts an exemplary structure of a 3-Misses (3-M) hash table 200, in accordance with an exemplary embodiment of the present teaching. The 3-M hash table 200 comprises an index file 210 and an overflow file 240. The index file 210 further comprises one or more base slots 220 and optionally one or more rehashed slots 230. All slots in the base slot region 220 may be of equal size so that the starting address of any slot may be determined based on the starting address of the first base slot S0 and the size of the base slots. Each of the rehashed slots in 230 corresponds to a base slot in 220 and is created upon rehashing the base slot. In general, a rehashed slot has a size larger than that of the corresponding base slot, e.g., double the size of its corresponding base slot. For example, as illustrated, a base slot S1 in 220 may be rehashed to create a rehashed slot RHS1 in 230 so that information in base slot S1 now points to the rehashed slot RHS1. Similarly, base slot S2 may be rehashed when needed so that a rehashed slot RHSk may be generated in 230 and information in base slot S2 now points to RHSk.

Figure 3:
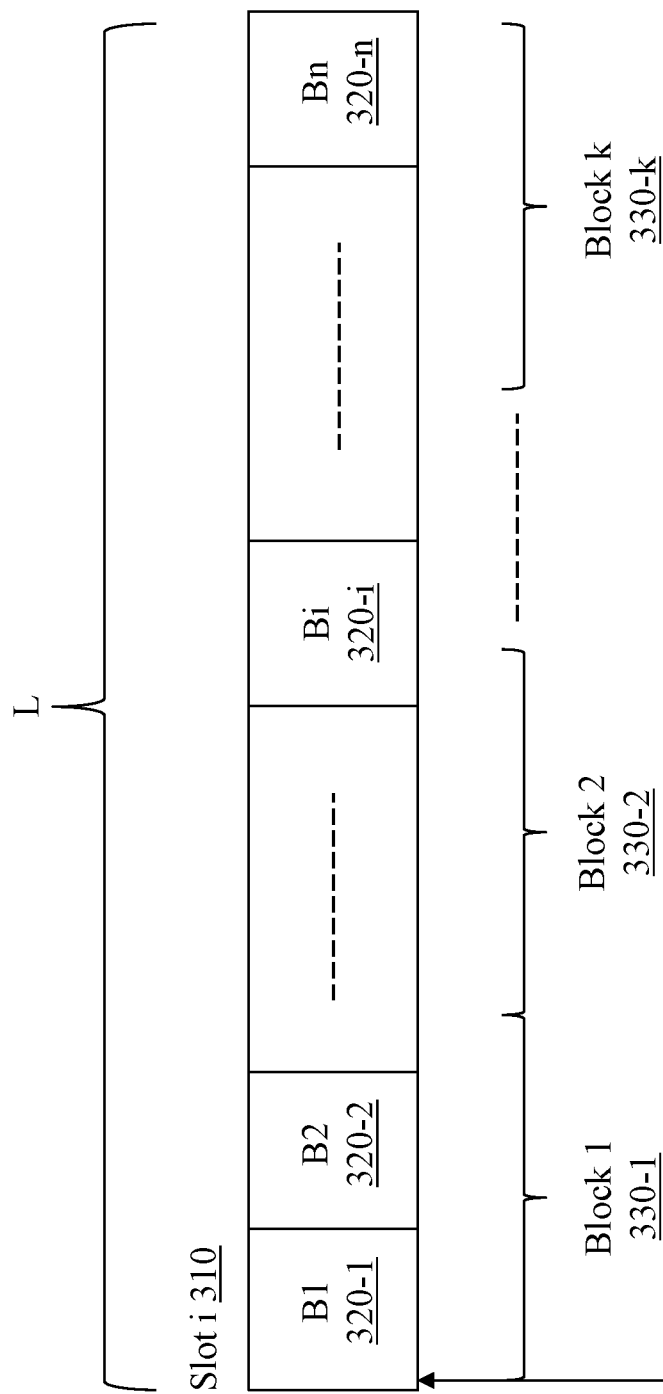
FIG. 3 depicts an exemplary structure of a slot in a 3-M hash table, in accordance with an exemplary embodiment of the present teaching.

Each slot in the index file 210, whether it is base or rehashed, is organized with one or more buckets, although a rehashed slot may include more buckets than its corresponding base slot. One example is illustrated in FIG. 3, which depicts an exemplary structure of a slot in a 3-M hash table, in accordance with an exemplary embodiment of the present teaching. As illustrated, an exemplary slot i 310 is of size L and has n buckets 320, including B1 320-1, B2 320-2, ..., Bi 320-i, Bn 320-n. Buckets in a slot may also be equal sized and together they may occupy a certain number of physical memory or storage blocks. As shown in FIG. 3, the exemplary slot i 310 occupies k physical memory or storage blocks, from block 1 330-1, ..., block 2 330-2, ..., to block k 330-k, with a total length L=k*B, wherein B is the block size. With this organization of a slot, the starting address of each slot can be determined based on the starting address of the first slot and the known slot size. For instance, the starting address Ai of exemplary slot i 310 can be determined to be (i−1)*L+starting address for the index file of the 3-M hash table.

For a rehashed slot, the starting address may be determined during rehashing based on the existing size and available capacity of the index file, e.g., if a sufficiently large contiguous region of the index file is available to contain the data for the rehashed slot, the rehashed slot may be assigned a starting address within that region and the blocks corresponding to that slot may be marked as allocated in the storage manager. Otherwise, if there is no such contiguous available region that is large enough to hold the rehashed slot, then the index file may be extended to make such a region available.

Figure 4:
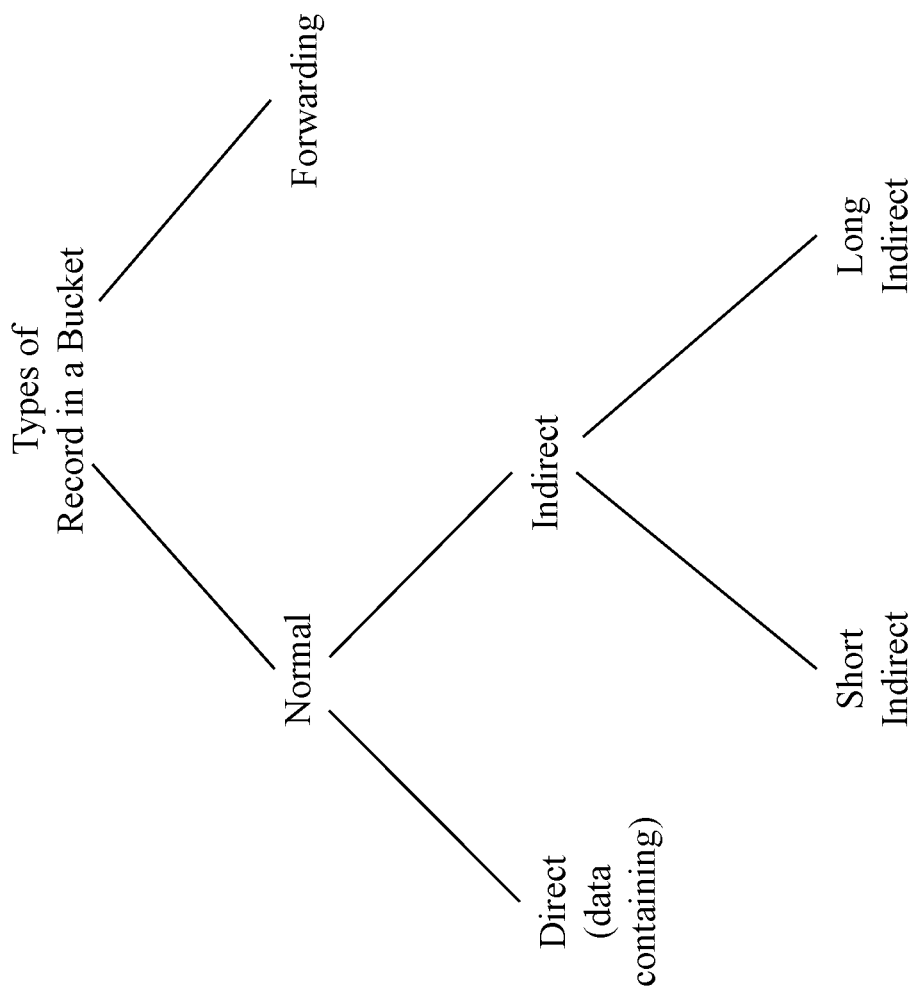
FIG. 4 shows exemplary types of records in a bucket of a slot in a 3-M hash table, in accordance with an exemplary embodiment of the present teaching.

Each bucket in a slot may be structured to store information. In the 3-M hash table, a bucket may be used to store different types of information, depending on a specific situation. FIG. 4 shows exemplary types of records in a bucket of a slot in a 3-M hash table, in accordance with an exemplary embodiment of the present teaching. A bucket may store a normal record or a forwarding record. A forwarding record is a record that indicates that the slot that the bucket is in has been rehashed and provides information that points to the rehashed slot. A normal record in a bucket provides information related to the data to be accessed. A normal record may also be of different types. As illustrated in FIG. 4, a normal bucket record may be a direct record type or a data containing record, i.e., the data are stored directly in the bucket of the slot in the index file 220 of the 3-M hash table. In this case, the data can be stored or retrieved directly from the index file. This reduces the number of cache hostile accesses as compared with the traditional hash table.

A normal bucket record may also be of an indirect type, indicating that data are not in the index file and what is stored in the bucket can be used to direct to where the data can be found. That is, an indirect record is a pointer pointing to where the data are stored. There are further different types of indirect record, namely short indirect record and long indirect record. A short indirect record is a record that directs to a location for data that can be stored in one memory block. A long indirect record is a record that directs to a location for data that occupy more than one block of memory or storage space. Through different types of indirect records, indexing to data of a large range of variable lengths can be done efficiently. Details about organizations or structures of different types of records in a bucket will be provided below with reference to FIGS. 5-11C.

As discussed herein, a direct record in a bucket in a 3-M hash table is one that stores data directly therein so that an access to the data stored in a direct record can be accomplished directly in the index file 210 without another cache hostile access, reducing the number of such cache hostile accesses compared to the number required if using a conventional hash table. FIG. 5 depicts an exemplary structure of a record containing bucket in a slot of a 3-M hash table, in accordance with an exemplary embodiment of the present teaching. A bucket with various records starts with a bucket displacement (BD) field 510 and ends with an end of data (EOD) field 530 and with one or more records 520 in-between, e.g., first record R1 520-1, second record R2 520-2, . . . , and mth record Rm 520-$m$. A record in a bucket may be a direct record or an indirect record, while an indirect record in turn may be either a short indirect record or a long indirect record. In some embodiments, the lengths of different records may vary, depending on the nature of the records. A record for storing direct data may vary in length depending on the lengths of the various components of the record (e.g., a variable-length key and a variable-length value). As long as the data can fit in a bucket, the data can be stored directly in a bucket in the index file 210. For an indirect record, as the purpose is for redirecting to a location in the overflow file 240 for the actual data stored therein, the length for a particular type of indirect record in a bucket may be of a fixed size, as will be discussed below. Each of the records in a record containing bucket illustrated in FIG. 5 may be of a different size, allowing efficient storage of variable-length records in the index file. In each of the records in a bucket, whether direct or indirect, information stored therein is organized in accordance with a certain structure as will be discussed in detail below.

Figure 6A:
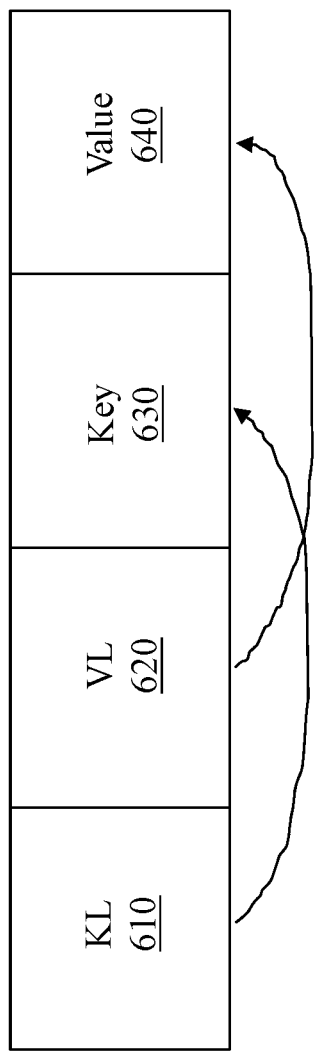
FIG. 6A depicts an exemplary structure of a direct record in a bucket of a slot in a 3-M hash table, in accordance with an exemplary embodiment of the present teaching.
Figure 6B:
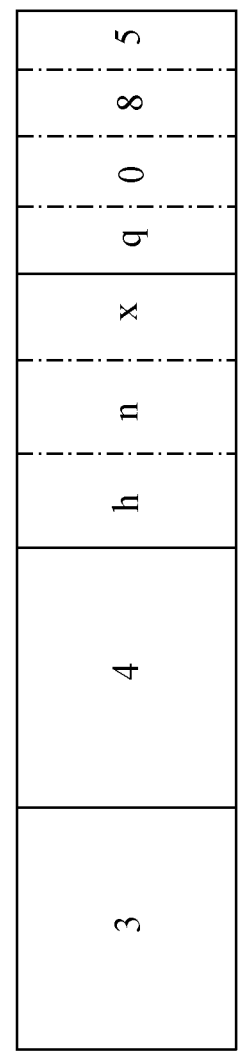
FIG. 6B provides an example direct record in a bucket of a slot in a 3-M hash table, in accordance with an exemplary embodiment of the present teaching.

FIG. 6A depicts an exemplary structure of a direct record in a bucket of a slot in a 3-M hash table, in accordance with an exemplary embodiment of the present teaching. As illustrated, a direct record stored in a bucket includes at least 4 fields, including a key length (KL) field 610, a value length (VL) field 620, a key field 630, and a value field 640. As illustrated, the value in KL field 610 refers to the length of the key stored in key field 630, while the value of VL field 620 indicates the length of the value field 640. One example of a direct record is provided in FIG. 6B, in accordance with an exemplary embodiment of the present teaching. In this example, the data stored directly in the bucket includes a key ("hnx") in the key field 630 and a value ("q085") in the value field 640 so that the value of KL field 610 is 3, referring to the length of the key stored and the value of VL field 620 is 4, referring to the length of the value stored in the record. As can be seen, using the structure of a direct record, direct data of variable lengths may be stored, retrieved, and managed according to the specified lengths.

Figure 7A:
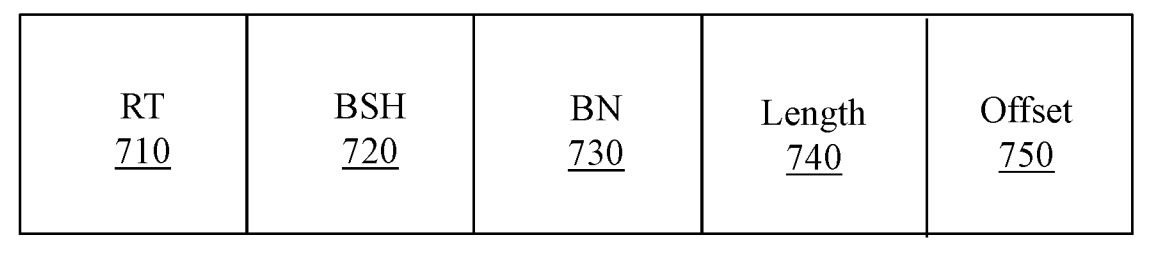

FIG. 7A depicts an exemplary structure of a short indirect record in a bucket of a slot in a 3-M hash table, in accordance with an exemplary embodiment of the present teaching. As discussed herein, a short indirect record is for directing to a location in the overflow file 240 for data that can be stored in a single physical memory block. Data referred to by a short indirect record may be of any length (so long as it is shorter than one physical block) so that it may be stored in a block with a starting location in the block. As shown in FIG. 7A, a short indirect record may be organized with a plurality of fields provided to direct to a block with the indication of a starting location within the block and the length of the memory or storage used to store the data. In this exemplary structure, a short indirect record includes a record type (RT) field 710, a bucket selector hash (BSH) field 720, a block number (BN) field 730, a length field 740, and an offset field 750. The RT field 710 indicates the record type is short indirect, the BN field 730 provides a block number of the block where the data are stored. The length 740 indicates the length in the block occupied by the data. The offset field 750 points to an offset location within the block where the data start.

The BSH field 720 may be included herein to facilitate more efficient search. Without such a BSH field, each indirect record encountered during a search for a record by key would require an additional cache-hostile access to compare the key being searched for with the key for that indirect record. With the BSH field included in a short indirect record, such a cache-hostile access is needed only if the BSH computed for the key being searched for is the same as the BSH filed in the indirect record. E.g., with a 32-bit BSH field, the BSH for the key being searched for will match the BSH field for the indirect record on average only once in approximately 4 billion record references, rather than once per record.

Figure 7B:
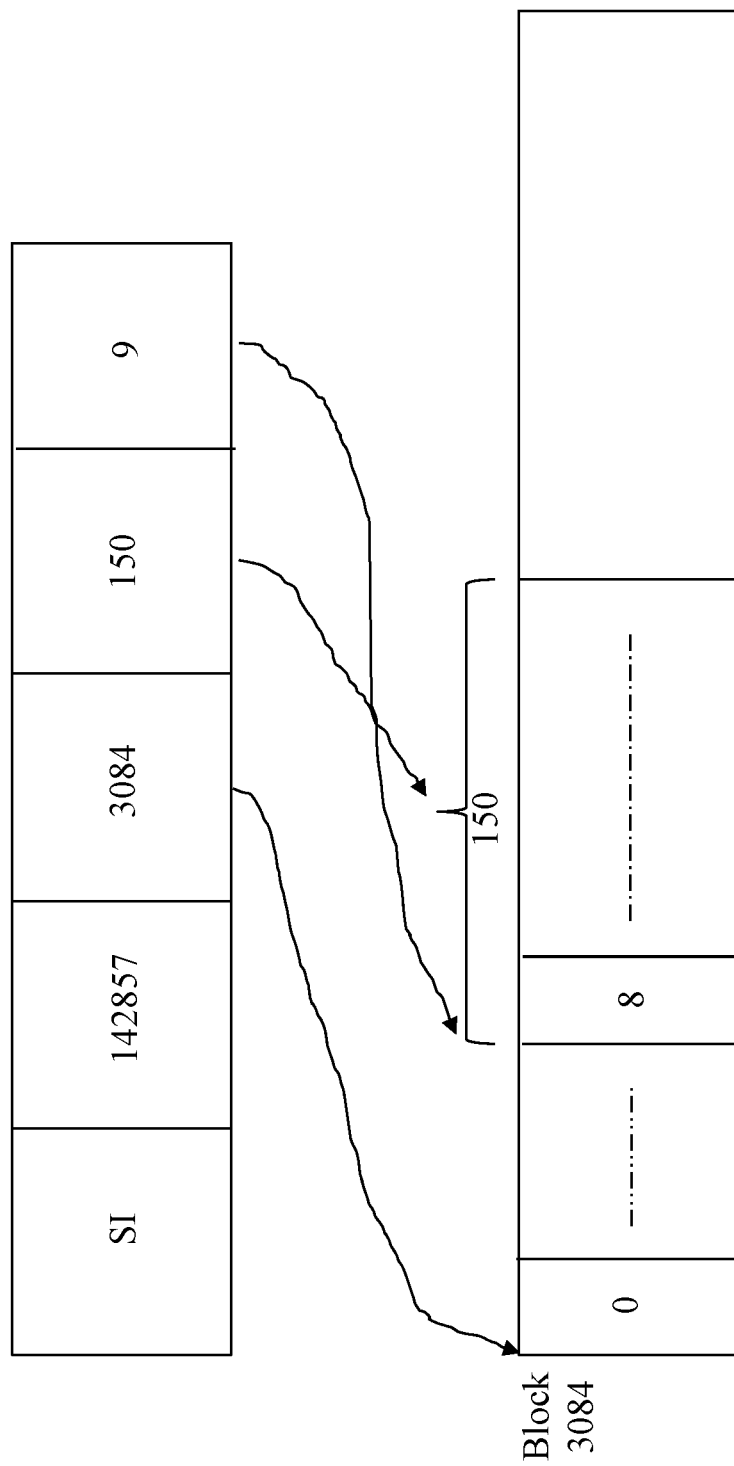
FIG. 7B provides an example short indirect record in a bucket of a slot in a 3-M hash table pointing to a block in an overflow file, in accordance with an exemplary embodiment of the present teaching.

Through the content in such a short indirect record as shown in FIG. 7A, the block and the location therein where data are stored can be identified. FIG. 7B provides an example short indirect record in a bucket of a slot in a 3-M hash table pointing to an overflow block where data are stored, in accordance with an exemplary embodiment of the present teaching. In this example, the RT field 710 has a value "SI" indicating that it is a short indirect record. The value in BN field 730 is 3084, pointing to a physical block with a block number 3084 in the overflow file 240. Value 9 in the offset field 750 indicates a starting location offset from the beginning of block 3084 where the data start, while the value 150 in the length field 740 provides the length in memory the data occupy in the block starting from the offset location. As can be seen, using the information in a short indirect record, the data can be precisely located. In addition, the data so referenced can be of any length so long as it is shorter than one block. Although the exemplary embodiment as illustrated in FIGS. 7A-7B includes five fields (710-750) in a short indirect record, this is merely for illustration and not intended to limit what a short indirect record may include. Additional fields, if needed depending on applications, may also be introduced.

Figure 8A:
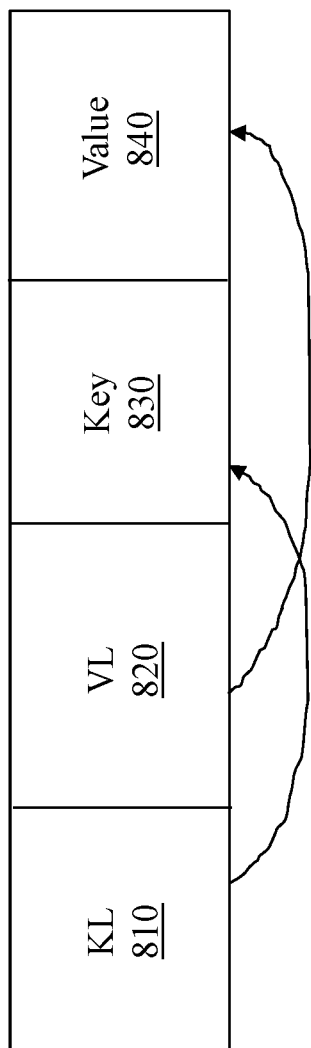
FIG. 8A depicts an exemplary structure of short indirect data in a block of an overflow file in a 3-M hash table, in accordance with an exemplary embodiment of the present teaching.
Figure 8B:
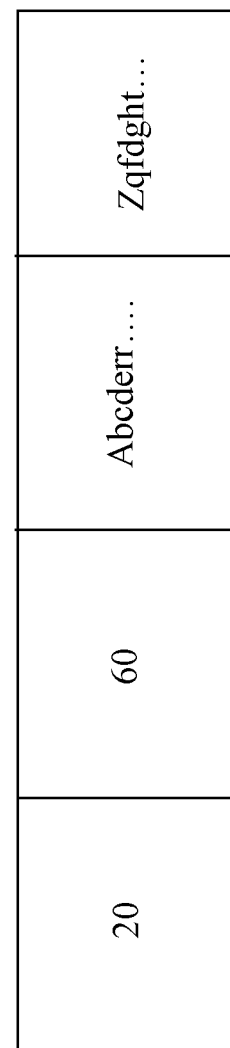
FIG. 8B provides example short indirect data in a block of an overflow file in a 3-M hash table, in accordance with an exemplary embodiment of the present teaching.

The short indirect record as depicted in FIGS. 7A-7B directs from the index file 210 to a specific location in a block in the overflow file 240. Data stored in a pointed block of the overflow file 240 may include both key and value and they are stored with a certain data structure which needs to be further defined. FIG. 8A depicts an exemplary structure of short indirect data stored in a 3-M hash table, in accordance with an exemplary embodiment of the present teaching. As can be seen, the structure of data stored in a block of the overflow file 240 (referred to by a short indirect record in a bucket of a slot in the index file 210 as shown in FIGS. 7A-7B) is similar to that of direct data (shown in FIG. 6A). There are 4 exemplary fields, including key length (KL) field 810, value length (VL) field 820, key field 830, and value field 840. The value in the KL field 810 defines the length of the key stored in key field 830, while the value in the VL field 820 defines the length of the value of data stored in the value field 840. FIG. 8B shows an example short indirect data stored in a block of the overflow file of the 3-M hash table 200, in accordance with an exemplary embodiment of the present teaching. As can be seen that in this way, data of variable lengths can be flexibly stored and referenced precisely via the 3-M hash table 200.

Although the exemplary embodiment or example as presented in FIGS. 8A-8B include four fields (810-840) in the short indirect data, this is merely for illustration and not intended to be limitations to what a short indirect data may include. The presented structure for short indirect data supports and facilitates variable length data storage and retrieval and can include more fields if needed without impacting its ability to enable storage and retrieval of short indirect data of variable length. For example, additional fields may be introduced with a known size for such additional fields. So long as the additional size related to such additional fields are accounted for in the total length 740, as the four fields (810-840) provide the needed information for supporting variable length data, additional fields can be flexibly added.

Figure 9A:
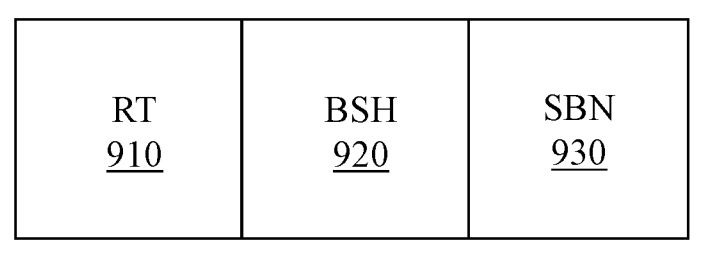

As discussed herein, some data can be stored directly in the index file 210, whereas some data stored in the overflow file 240 can be pointed to by an indirect record stored in a bucket of a slot in the index file 210. For short data that can be stored in a single block, a short indirect record (as shown in FIGS. 7A-7B) can be stored in a bucket in the index file 210 in order to direct access to a block in the overflow file 240 and the key and value of the short data may then be further accessed in accordance with the structure as illustrated in FIGS. 8A-8B. As discussed herein, for long indirect data, defined to be data that cannot be stored in a single block, a long indirect record may be stored in the index file for directing to the location in the overflow file 240 where the long data are stored. FIG. 9A depicts an exemplary structure of a long indirect record in a bucket of a slot in a 3-M hash table, in accordance with an exemplary embodiment of the present teaching. As depicted, a long indirect record may include a plurality of fields, including a record type (RT) field 910, a bucket selector hash (BSH) field 920, and a starting block number (SBN) field 930. The RT field 910 has a value that indicates the type of this record. The BSH field 920 is provided to facilitate more effective search as explained above. The SBN field 930 provide a block number that points to a block indicating the start of the region in the overflow file where the long data are stored.

FIG. 9B provides an example long indirect record in a bucket of a slot in a 3-M hash table pointing to a block in an overflow file, in accordance with an exemplary embodiment of the present teaching. As shown, in the example, the long indirect record in the index file indicates in the RT field 910 that the record type is long indirect (LI) and with a bucket selector hash code 314159. The block number 2415 is provided in the SBN field 930, which points to block 2415 in the overflow file 240, which is where the long data at issue start. Similar to the discussion related to a short indirect record, although the exemplary embodiment as illustrated in FIGS. 9A-9B includes three fields (910-930) in a long indirect record, this is merely for illustration and not a limitation to what a long indirect record may include. Additional fields, if needed depending on applications, may also be introduced without an impact to the functionality served by the three fields as disclosed in FIGS. 9A-9B.

Figure 10A:
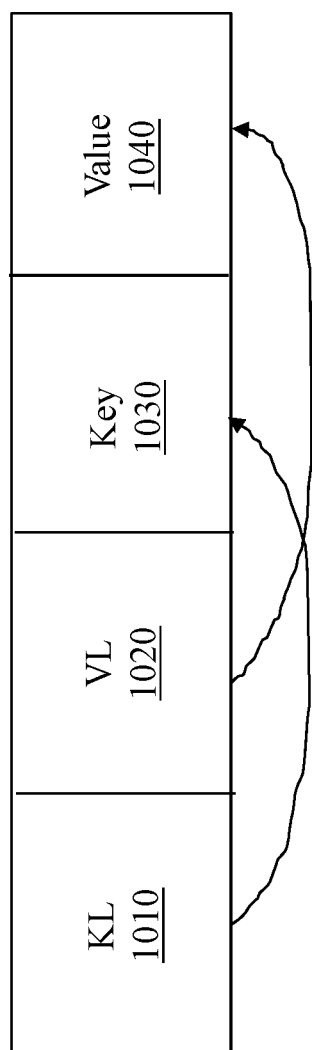
FIG. 10A depicts an exemplary structure of long indirect data in a block of an overflow file in a 3-M hash table, in accordance with an exemplary embodiment of the present teaching.
Figure 10B:
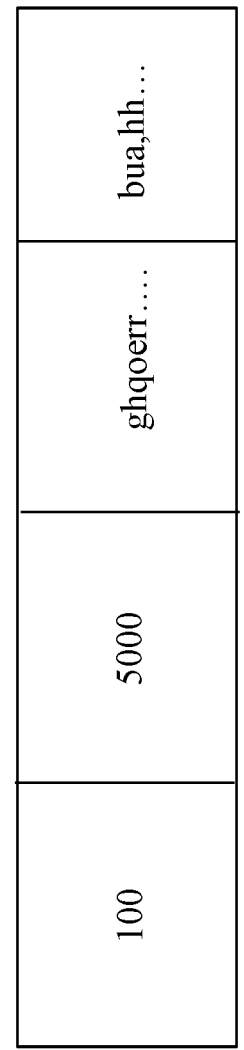
FIG. 10B provides example long indirect data in a 3-M hash table, in accordance with an exemplary embodiment of the present teaching.

Starting from a block in the overflow file 240 and pointed to via a long indirect record, the long data, which occupy more than a single block, may also be structured in a way that information is to be provided therein to facilitate storage and retrieval. The long data may include a key and a value, each of which may be stored separately with a respective length. FIG. 10A depicts an exemplary structure of long indirect data in the overflow file 240 in the 3-M hash table 200, in accordance with an exemplary embodiment of the present teaching. Similar to that for direct and short indirect data, long data are structured to include a number of fields. In the exemplary embodiment depicted in FIG. 10A, the long indirect data may include a key length (KL) field 1010, a value length (VL) field 1020, and followed by key 1030 and value 1040, where the value of the KL field 1010 specifies the length of the key 1030 of the long data and the value of the VL field 1020 provides the length of the value 1040 of the long data. FIG. 10B shows an example long indirect data stored in the 3-M hash table 200, in accordance with an exemplary embodiment of the present teaching. In this example, the length of the key is 100 and the length of the value of the long data is 5000. Such access control information is then followed by the actual key "ghqoerr . . . " in length 100 and value "bua,hh . . . " in length 5000, as specified.

Although the exemplary embodiment or example as presented in FIGS. 10A-10B include four fields (1010-1040) in long indirect data, this is merely for illustration, not as a limitation to what long indirect data may include. The presented structure for long indirect data supports and facilitates variable length data storage and retrieval and can include more fields when needed without impacting its ability to enable variable length storage and retrieval of long indirect data. Additional fields may be introduced so long as necessary information is provided in a self-contained manner in the long indirect data to specify different types of data stored therein in terms of, e.g., location and size of each, to facilitate needed storage management.

With reference to FIG. 4, a bucket in a slot of the 3-M hash table 200 can be a normal record or a forwarding record. As discussed herein, a normal record can be a direct, a short indirect, or a long indirect record, where a direct record has data stored directly in the bucket and an indirect record (short or long) provides index information pointing to the overflow file 240 where the actual data are stored. Data that can be fit in a bucket may be stored directly in the bucket as a direct record in the index file 210. By storing data directly in the index file 210, it reduces cache hostile access as compared with prior art hash tables capable of efficiently storing variable-length data. Direct data stored in the index file 210 may have different lengths as specified in each direct record (see FIGS. 6A-6B). As also discussed herein, data that cannot fit in a bucket of the index file 210 may be stored in the overflow file 240 and a corresponding index record may then be stored in a bucket of the index file 210 that points to the overflow file location where the corresponding data are stored. Depending on the length of data (whether it can fit in one block), an index record for indirect data may either be a short indirect record or a long indirect record. The structures discussed herein for direct, short indirect, and long indirect records or data all facilitate variable length data storage and retrieval. Thus, through normal records, the number of hostile storage accesses is reduced and variable length data storage can be achieved via the 3-M hash table as described herein.

As depicted in FIG. 4, a record in a bucket of a slot in 3-M hash table 200 may also be a forwarding record, which serves to redirect access to a rehashed slot in the case where the (base) slot has been rehashed. According to an embodiment of the present teaching, each individual slot in the 3-M hash table 200 may be individually assessed as to when it should be rehashed. The criterion or criteria used to assess when a slot needs to be rehashed may be defined based on, e.g., application needs such as search time needed to find a space within the slot or the space that is still available in the slot drops below a certain level. It is also possible to determine slots to be rehashed based on overall statistics for the table rather than just at the slot level, e.g., rehashing some fraction of the slots every time a certain number of elements have been added. When slots in the 3-M hash table can be individually rehashed, the length of time needed to add a record can be more closely bounded compared to the situation where the whole hash table may need to be rehashed during the addition of a record. This makes it possible for the 3-M hash table 200 to continue to respond to record insertion requests even during the overall rehashing operation. In general, a rehashed slot is larger in size than the base slot. The increase in size of a rehashed slot as compared with its base slot may be determined based on application needs. For example, a rehashed slot may be twice as big as its base slot. Other increments are also possible.

Figure 11B:
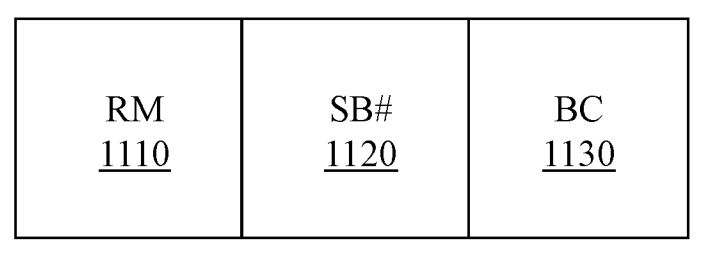
Figure 11C:
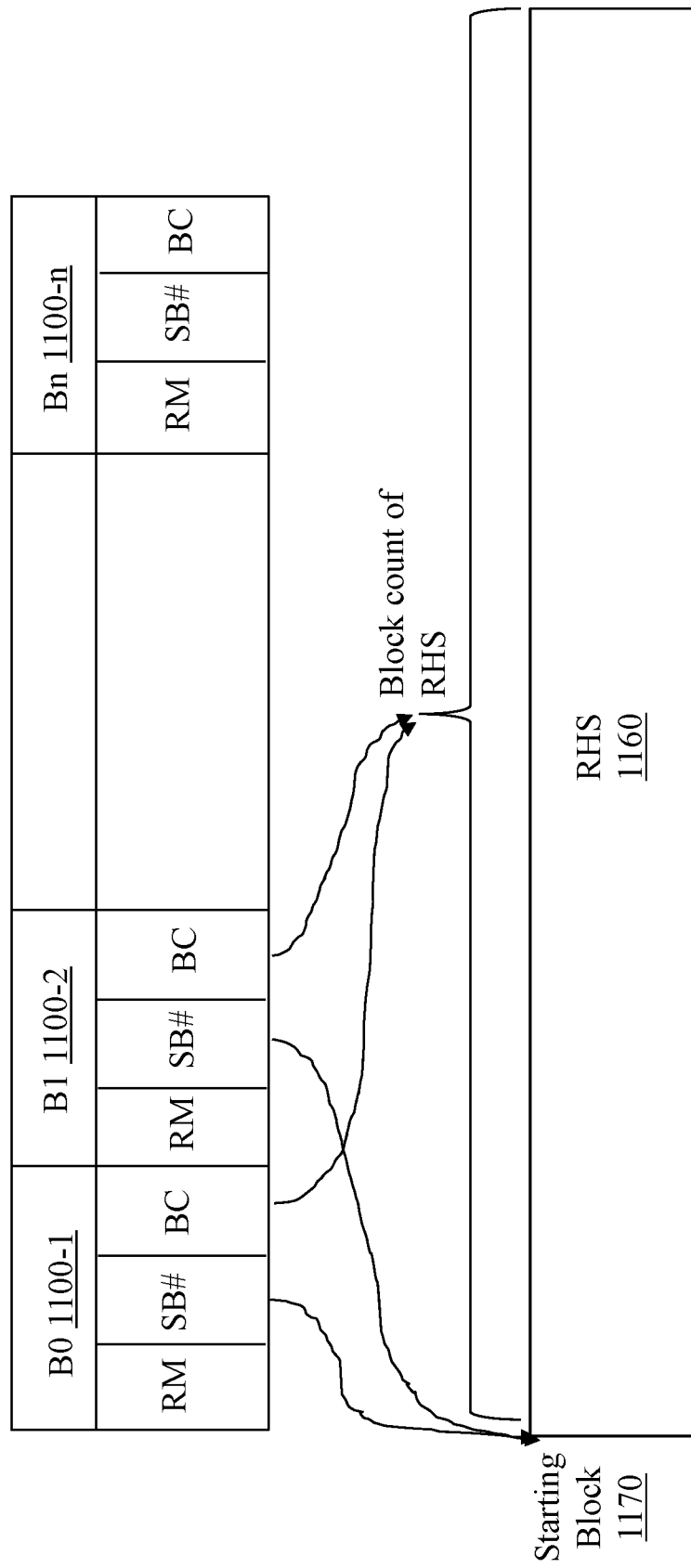
FIG. 11C depicts a base slot in a 3-M hash table with buckets filled with forwarding records pointing to a rehashed slot, in accordance with an exemplary embodiment of the present teaching.

In some embodiments of the present teaching, when a base slot in the 3-M hash table 200 is rehashed, all buckets of the base slot provide forwarding information that points to the rehashed slot. FIG. 11A depicts an example base slot, e.g., slot i 1100, that includes a forwarding record in all buckets directing to its corresponding rehashed slot, in accordance with an embodiment of the present teaching. As illustrated, base slot i have n buckets, B1 1100-0, B1 1100-1, Bn 1100-n, each of which has stored therein a forwarding record. FIG. 11B depicts an exemplary structure of a forwarding record stored in buckets of a base slot in the 3-M hash table 200, in accordance with an exemplary embodiment of the present teaching. As depicted in this exemplary structure, a forwarding record comprises three fields, i.e., a field for a redirect marker RM 1110 indicating that this is a forwarding record, a field providing a starting block number SB # 1120, and a field indicating a block count (BC) 1130 on a number of blocks that the rehashed slot occupies. Such a forwarding record comprising RM, SB#, and BC is provided in all buckets of a base slot that has been rehashed, as shown in FIG. 11C, where RM, SB#, and BC in each forwarding record point to a rehashed slot RHS 1160 by directing, via SB#, to a starting block 1170 of the RHS 1160 and indicating the length, by block count 1120, of the rehashed slot 1160.

FIG. 11D provides a snapshot of the index file 210 with different base slots having their buckets filled with forwarding records for directing to their respective rehashed slots, in accordance with an exemplary embodiment of the present teaching. In this illustrated example, there are two slots, i.e., slot Si and slot Sk, that have been rehashed to RHSi and RHSk, respectively. As such, the buckets in these two base slots are provided with forwarding records for directing to their corresponding rehashed slots, respectively. Specifically, the SB# field in the forwarding record in slot Si has value 234 pointing to the starting block 234 of the rehashed slot RHSi. The SB# field in the forwarding record in slot Sk has value 419, pointing to the starting block 419 of the rehashed slot RHSk. In this example, the block count field BC in base slot Si is 2, indicating that the rehashed slot RHSi occupies two blocks, while the block count field BC in base slot Sk is 4, indicating that its rehashed slot RHSk occupies 4 blocks. In alternative embodiments, the size of rehashed slots may be increased in a uniform way instead of being variable increments. Such decision may be made according to application needs.

Figure 11E:
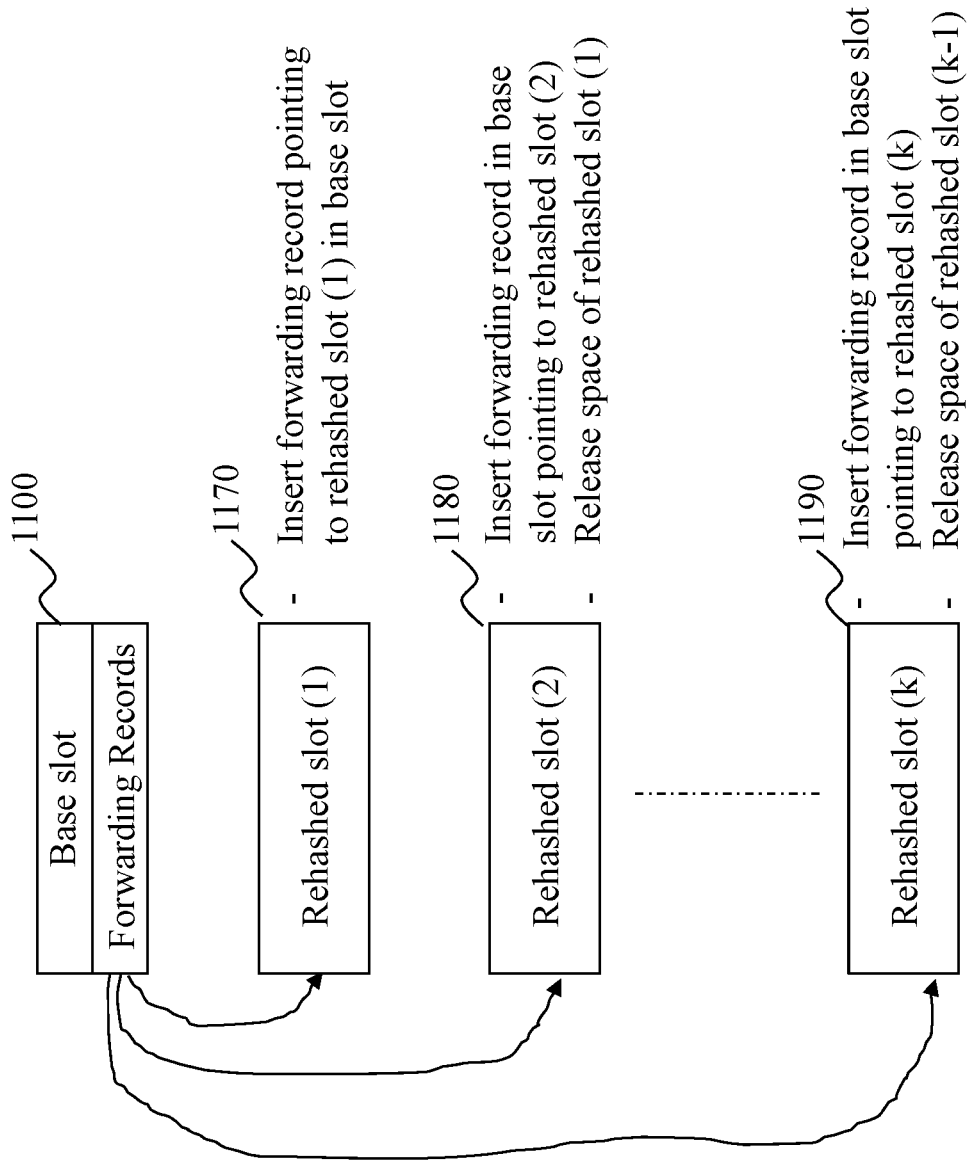
FIG. 11E depicts exemplary relationships between a base slot and a plurality of rehashed slots created at different times, in accordance with an exemplary embodiment of the present teaching.

What is illustrated in FIG. 11D corresponds to rehashing base slots to rehashed slots. According to the present teaching, a base slot is one that is created when the 3-M hash table 200 is initially created, while rehashed slots are created during a rehashing operation. A rehashed slot may also be rehashed again, e.g., when the available space in the rehashed slot drops to a certain low level. This is shown in FIG. 11E, where slot i 1100 is a base slot and is illustrated to have been rehashed in consecutive rounds of rehashing that create a first rehashed slot 1170, a second rehashed slot 1180, . . . , and a kth rehashed slot 1190. Each round of rehashing may yield a larger rehashed slot. While the records in each slot that is rehashed (it can be the base slot i 1100, the first rehashed slot 1170, . . . ) are always copied into a rehashed slot, the forwarding records are always stored in the base slot. This is for ensuring that the maximum number of misses remains at three. This is shown in FIG. 11E, where it is always the base slot that stores the forwarding records pointing to the current (most recent) rehashed slot.

As such, when a slot that is not a base slot is rehashed, after the records stored therein are copied to the newly rehashed slot, the slot from which records have been copied no longer stores any useful information. In this situation, the space occupied by the slot is returned to the storage manager for reuse. This is indicated in FIG. 11E, e.g., in rehashing the base slot 1110, the first rehashed slot 1170 is created and forwarding records are inserted to the base slot 1100. In rehashing the rehashed slot 1170, newly rehashed slot 1180 is created and forwarding records pointing to the newly rehashed slot 1180 are stored back in the base slot 1110 and the space occupied by rehashed slot 1170 is returned to the storage for reuse, . . . , etc. In this manner, the redirection to a big enough slot always constitutes only one miss.

As discussed herein, the 3-M hash table 200 having an index file 210 and an overflow file 240, structured and operated in the manner as described herein leads to reduced cache hostile accesses, variable length data storage and retrieval, and rehashing with continued operation without significant downtime due to slot based rehashing scheme. With the 3-M hash table 200, the storage operation is limited to a maximum of 3 misses (cache-hostile accesses). When a hash code is computed, it is used to locate a bucket in a slot the index file 210 so that this corresponds to the first miss. If the record in the bucket stores a direct record, there is no further miss and the operation is accomplished with one miss. If the record in the bucket is an indirect record, this corresponds to the second miss because the content in the indirect record does not contain the actual data but instead contains information redirecting access to the overflow file 240 for the actual data. Whether it is a short indirect or a long indirect record, the short indirect data or the long indirect data can be accessed with two misses.

The only situation that a third miss will occur is when the slot identified using the hash code has been rehashed. The forwarding records in the buckets of the slot direct to the rehashed slot, which constitutes the second miss. If the record in a bucket in the rehashed slot is a direct record or a data containing record, then the storage operation completes with two misses. However, if the record in the bucket in the rehashed slot is an indirect record, whether a short or a long indirect record, it corresponds to the third miss as the indirect record directs to the overflow file 240 for the actual data. Therefore, given the mechanism of the 3-M hash table 200, the maximum number of misses is three. Because the 3-M hash table 200 is variable-length capable, any data request with any length of data can be fulfilled with a maximum of three misses.

There are additional characteristics associated with the 3-M hash table that enable more efficient storage management operations. For example, because slots in the index file 210 and overflow file 240 are all addressed using offset block numbers relative to the starting block of the 3-M hash table, once the starting block of the 3-M hash table is known, all other slots can be addressed effectively, making the operation more efficient. Furthermore, the records and data in the 3-M hash table 200 can be stored in a format directly usable by an application or program so that no serialization or deserialization operations are needed during startup and shutdown, reducing the time needed for startup and shutdown compared to hash tables that do require serialization and deserialization.

Figure 12:
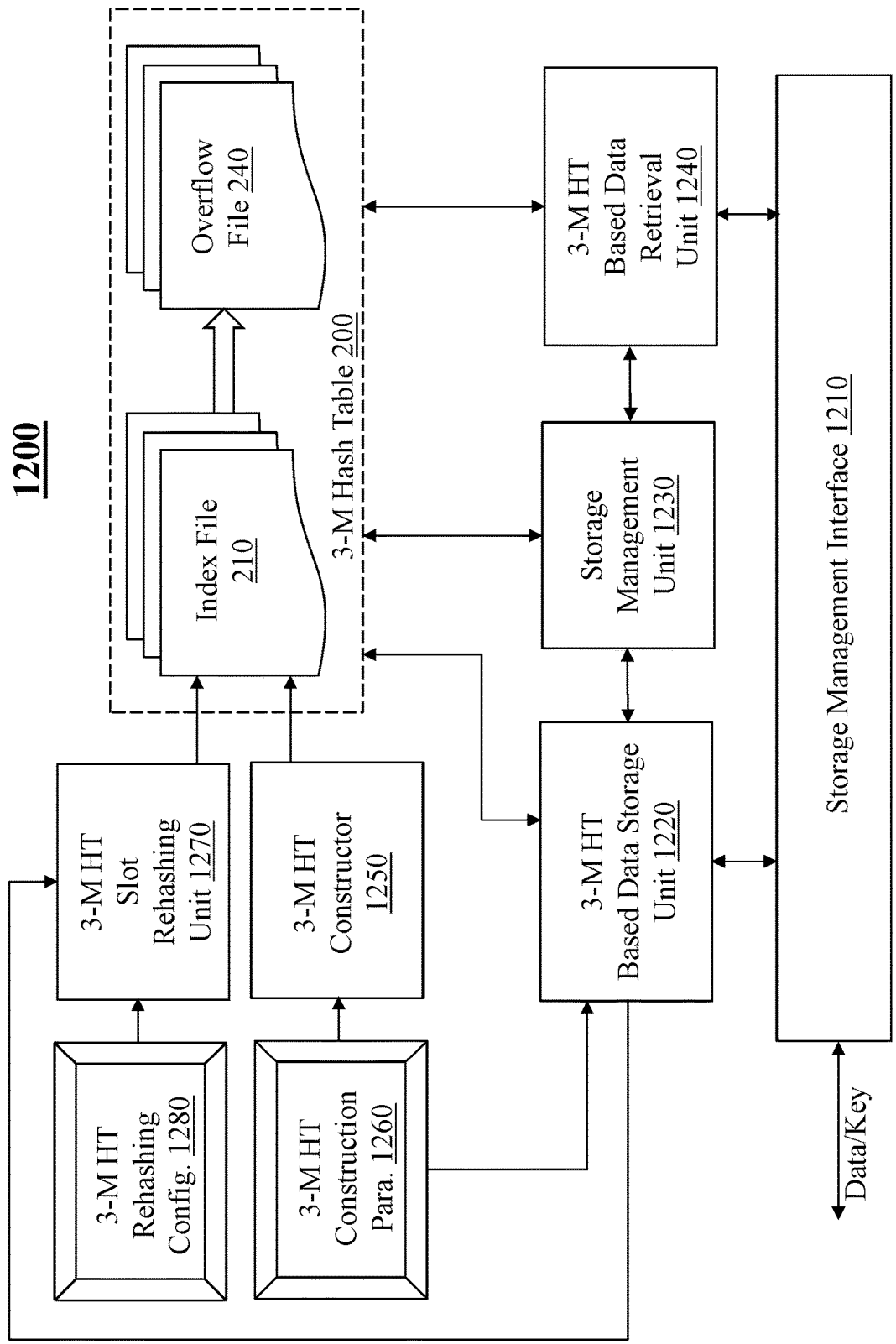
FIG. 12 depicts an exemplary high level system diagram of a storage management system facilitated by a 3-M hash table, in accordance with an exemplary embodiment of the present teaching.

FIG. 12 depicts an exemplary high level system diagram of a storage management system 1200 using the 3-M hash table 200, in accordance with an exemplary embodiment of the present teaching. In this illustrated embodiment, the 3-M hash table 200 includes the index file 210 and the overflow file 240, where indirect records in the index file point to where indirect data are stored in the overflow file 240. The storage management system 1200 comprises two operational parts, including a first part for creating and maintaining the 3-M hash table 200 and a second part for handling data storage requests based on the 3-M hash table 200. The first part comprises a 3-M HT constructor 1250 and a 3-M HT slot rehashing unit 1270. The second part corresponds to the storage management operation and comprises a 3-M HT based data storage unit 1220, a storage management unit 1230, and a 3-M HT based data retrieval unit 1240.

Figure 13A:
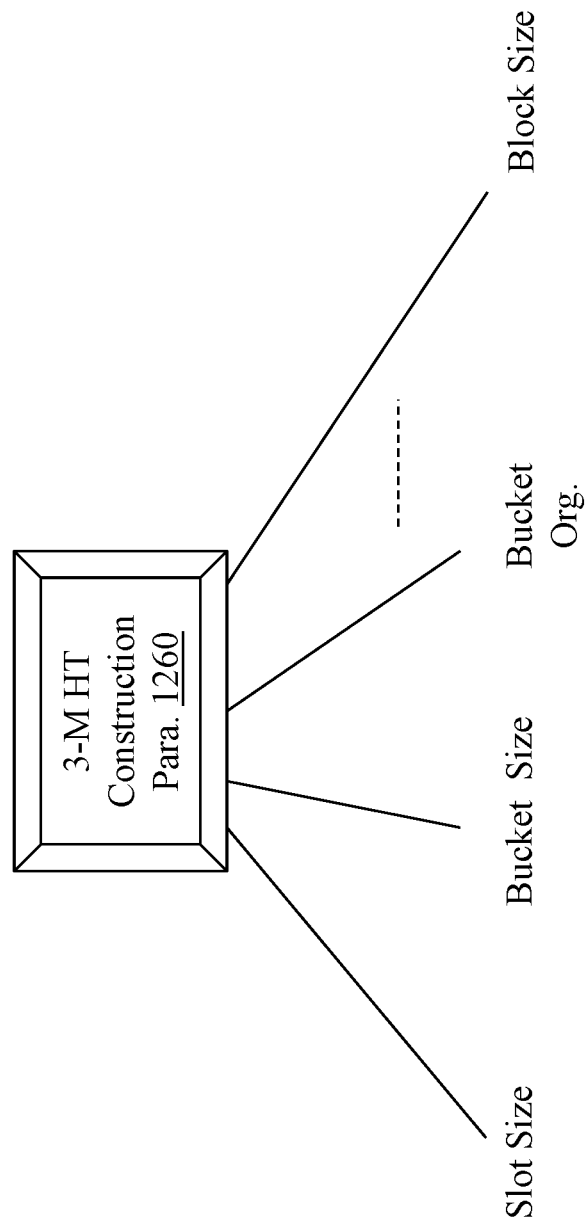
FIG. 13A illustrates exemplary types of parameters used in constructing a 3-M hash table, in accordance with an exemplary embodiment of the present teaching.

The 3-M HT constructor 1250 is provided to create the 3-M hash table 200 in accordance with 3-M HT construction parameters stored in 1260. With this arrangement, the 3-M HT constructor 1250 may be provided in a generic form and it operates to create a 3-M hash table of any characteristics in accordance with the parameters archived in 1260. FIG. 13A illustrates, in accordance with an exemplary embodiment of the present teaching, exemplary types of parameters used in constructing the 3-M hash table 200, which may include, e.g., a number of slots in the index file 210, a number of blocks each slot occupies, a number of buckets in each slot and an organization thereof (not shown), the size of each bucket, internal organization of a bucket, . . . , and block size. Such parameters may be specified based on application needs.

Figure 13B:
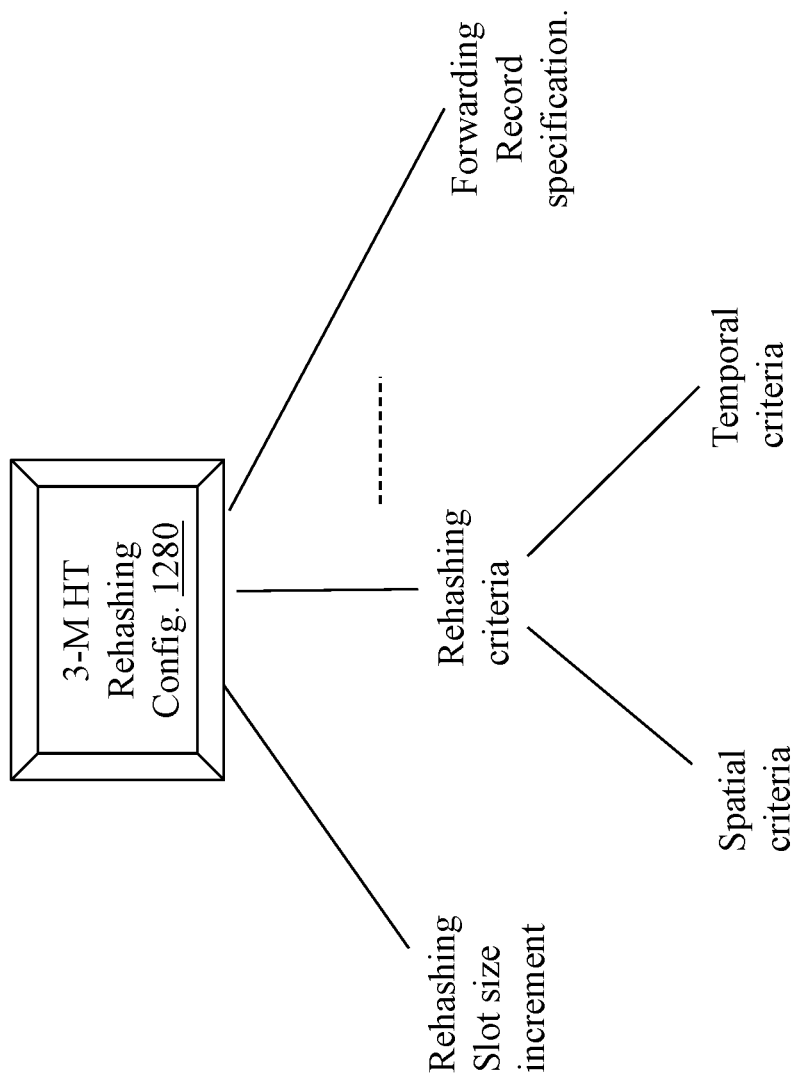
FIG. 13B illustrates exemplary types of configured conditions used related to rehashing a slot of a 3-M hash table, in accordance with an exemplary embodiment of the present teaching.

As discussed herein, each slot, once created in the index file 210, may be rehashed when, e.g., certain conditions are met. In the illustrated embodiment of the storage management system 1200 as illustrated in FIG. 12, the rehashing operation may be carried out by the 3-M HT rehashing unit 1270 based on 3-M HT rehashing configuration stored in 1280. Such 3-M HT rehashing configuration may specify various operational parameters needed in order to carrying out rehashing appropriately. For example, conditions under which a slot is to be rehashed may be defined, how rehashing is done may also be characterized, etc. FIG. 13B illustrates exemplary types of configured conditions/parameters related to rehashing a slot of the 3-M hash table 200, in accordance with an exemplary embodiment of the present teaching. As shown, configurations stored in 1280 may include criteria to be satisfied with respect to a slot in order for the slot to be rehashed, the increase in size to be applied to a rehashed slot as compared with the base slot, . . . and a specification of types of information to be places in a forwarding record. There may also be different types of rehashing criteria. In some embodiments, heuristics may be specified. In the illustrated embodiment, spatial related criteria and/or temporal related criteria may be provided for controlling when to rehash a slot.

Spatial related criteria may be related to, e.g., a percent of space in a slot that is still available because the smaller the space remaining available, the longer it may take to find such available space so that the performance degrades. When this happens, rehashing may be warranted to improve efficiency. On the other hand, temporal related criteria may be used from a different angle in controlling the timing of a rehashing decision. For example, a temporal criterion may define a limit in time needed to search for available space in a slot. When the time needed exceeds a certain level, it may indicate that rehashing is warranted in order to improve the efficiency. In some applications, it may also be possible to define a temporal related criterion based on a schedule, i.e., regularly rehashing a slot with a fixed interval which may be determined based on, e.g., average time observed for a needed rehashing learned from past operations. Such a learned interval may also be a function of the slot size and the nature of the programs or applications.

In some embodiments, the need for rehashing may be monitored by the 3-M HT slot rehashing unit 1270 based on criteria defined in the configuration 1280. In monitoring against the criteria for rehashing, relevant information associated with performance, such as the percent of remaining available space or time used to search for available space, etc. may be collected from the storage management operations. Such information may be collected from different units that handle storage access requests, e.g., the 3-M HT based data storage unit 1220.

Figure 14:
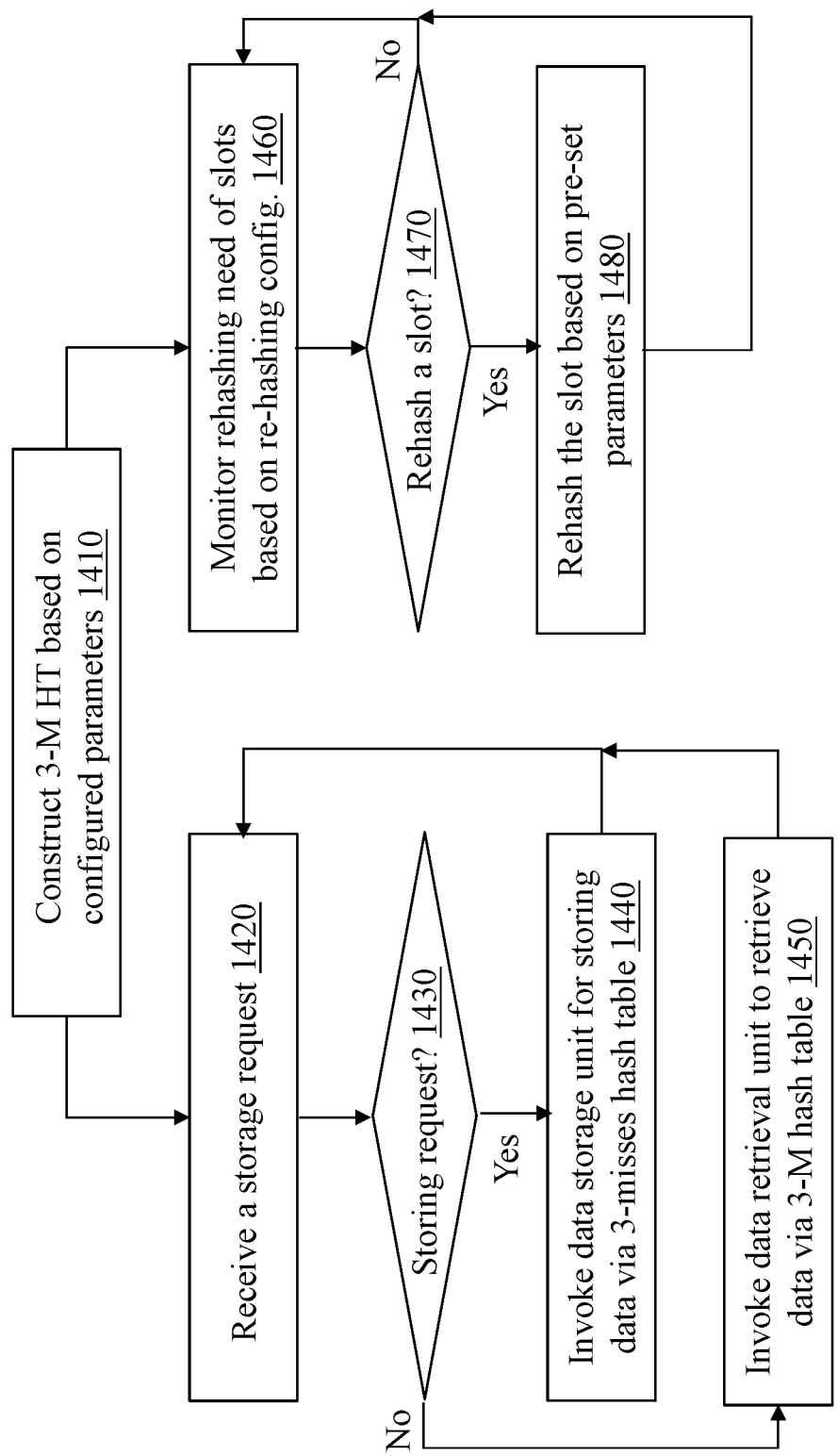
FIG. 14 is a flowchart of an exemplary process of a storage management system operating via a 3-M hash table, in accordance with an exemplary embodiment of the present teaching.

FIG. 14 is a flowchart of an exemplary high level process of the storage management system 1200, in accordance with an exemplary embodiment of the present teaching. In operation, the 3-M HT constructor 1250 constructs, at 1410, a 3-M hash table 200 based on, e.g., parameters in 1260. With the 3-M hash table 200 constructed, the operations of the storage management system 1200 may be executed in two parallel tracks. The first track of operation relates to handling data access requests based on the dynamically maintained 3-M hash table 200. The second track of operation relates to rehashing operations, including, e.g., dynamically monitoring the need for rehashing with respect to individual slots in the 3-M hash table 200, rehashing a base slot when it is needed, and populating forwarding records in the base slot once the rehashed slot is created.

In the first track of operation, when a request is received at 1420, the nature of the request is determined at 1430. If the request is for storing certain data in storage, the 3-M HA based data storage unit 1220 is invoked at 1440 to store the data in the storage via the 3-M hash table 200. If the request is for retrieving data stored in the storage, the 3-M HT based data retrieval unit 1240 is invoked at 1450 to retrieve the requested data from storage based on the 3-M hash table 200. The process of the first track of operation repeats the steps 1420-1450.

In the second track of operation, the 3-M HT slot rehashing unit 1270 monitors, at 1460, the slots in the 3-M hash table 200 in accordance with the conditions/criteria specified in 1280 to determine, at 1470, whether individual slots in the 3-M hash table 200 need to be rehashed. According to an embodiment of the present teaching, the assessment of whether rehashing is needed is made with respect to each individual slot so that rehashing is performed for each individual slot. In some embodiments, more than one slot may be monitored at the same time so that a rehashing decision may be made with respect to a group of slots and rehashing may be performed for multiple slots in the same rehashing operation. If no slot needs to be rehashed, the process repeats steps 1460-1470. If any slot in the 3-M hash table 200 needs to be rehashed, the 3-M HT slot rehashing unit 1270 rehashes, at 1480, any slot that needs to be rehashed. In some situations, a slot being rehashed may correspond to a base slot. In some situations, a slot being rehashed may not be a base slot. For instance, a slot being rehashed may itself be a rehashed slot. As discussed herein with respect to FIG. 11E, when a slot being rehashed is a base slot, a forwarding record is inserted into the base slot. When a slot being rehashed is not a base slot, a forwarding record is still inserted into the base slot of the slot being rehashed and the storage occupied by the slot being rehashed is then released back to the storage manager 1230 so that it can be reused. Significantly, always inserting a forwarding record into a base slot is relevant to ensure that the maximum number of misses in data access using the 3-M hash table 200 is three. While this flowchart represents the process of the storage management system 1200 at a high level, more detailed processes for rehashing as well as data storage and retrieval are provided below.

Figure 15:
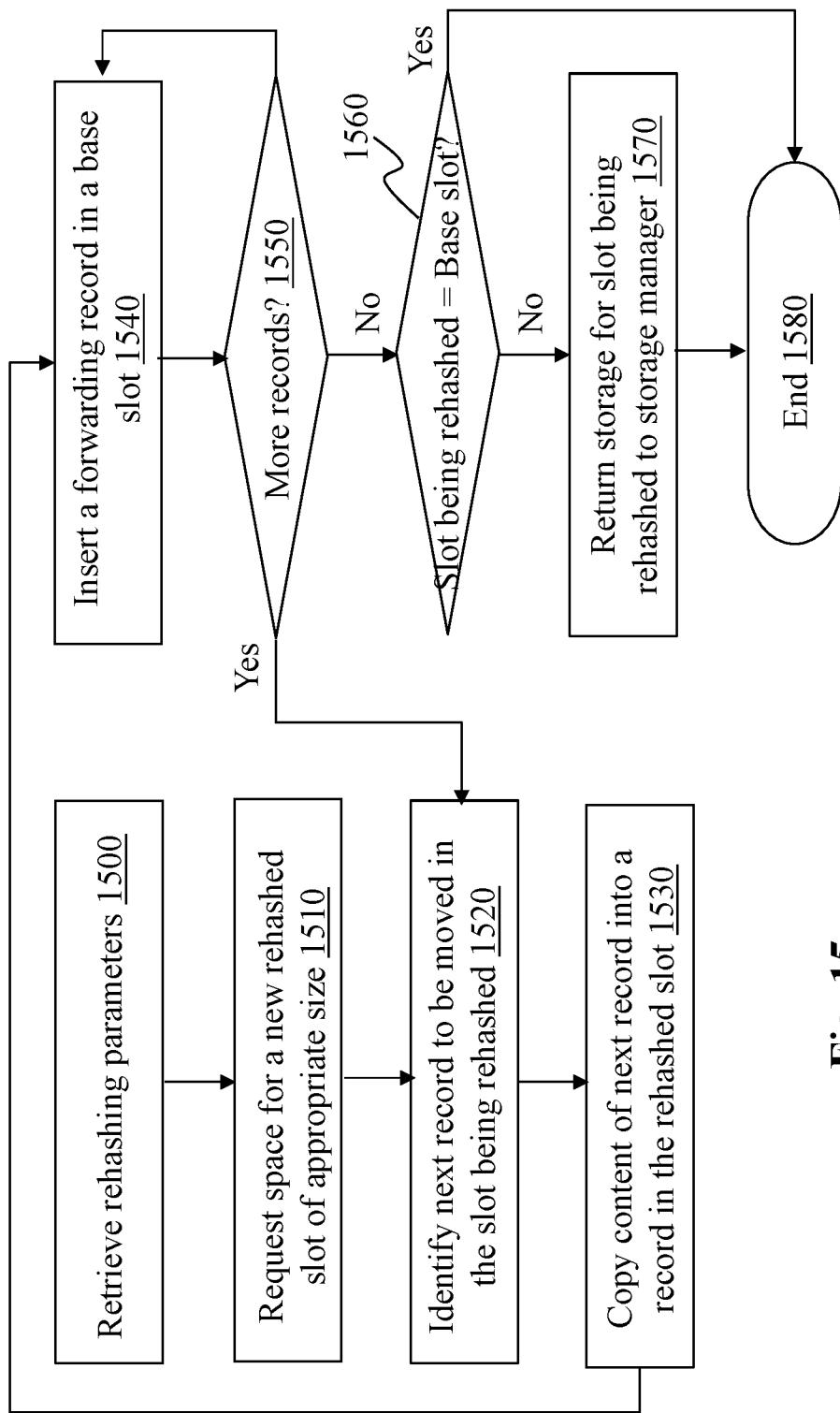
FIG. 15 is a flowchart of an exemplary process of a 3-M HT based rehashing unit, in accordance with an exemplary embodiment of the present teaching.

FIG. 15 is a flowchart of an exemplary process of the 3-M HT based rehashing unit 1270, in accordance with an exemplary embodiment of the present teaching. As discussed herein, whenever a slot, whether a base or non-base or rehashed slot, is rehashed, the records in the slot being rehashed are moved to the new rehashed slot. Regardless of whether the slot being rehashed corresponds to a base slot, a forwarding record is inserted into a corresponding record in a base slot in order to direct to the rehashed slot. As seen in FIG. 15, to rehash, parameters to be used for the rehashing operation are first retrieved, at 1500, from storage 1280. Such parameters may include an appropriate size of the rehashed slot in this round of rehashing. For instance, if a base slot of size A is rehashed to create a rehashed slot in the first round, the rehashed slot in the first round may have double the original size, i.e., 2 A. If the rehashed slot created in the first round needs to be rehashed again, the size of a rehashed slot in the second round may still be double of the slot being rehashed, i.e., 4 A. But as it is the second round, as compared with the size of the base slot, the size of the rehashed slot in the second round will be quadruple the size of the base slot.

With the retrieved rehashing parameters, the 3-M HT based rehashing unit 1270 requests, at 1510, the storage management unit 1230 to allocate space for a new rehashed slot of appropriate size. Once the new rehashed slot is allocated, the 3-M HT based rehashing unit 1270 first moves records stored in the slot being rehashed into the new rehashed slot by identifying, at 1520, a next record in the slot being rehashed, copying, at 1530, the content of the identified record in the slot being rehashed to a corresponding record in the new rehashed slot, and then inserting, at 1540, a forwarding record into a record in a base slot (either the slot being rehashed or the base slot of the slot being rehashed) so that it directs to the new rehashed slot. This process continues until all records in the slot being rehashed are copied over to the new rehashed slot, which is determined at 1550. If the slot being rehashed is a base slot, determined at 1560, then the rehashing process ends at 1580. Otherwise, as the forwarding records are saved in a base slot, in this situation the slot being rehashed does not store anything useful for future data access, so the space occupied by the slot being rehashed is returned back to the storage management unit 1230 before the process ends at 1580.

Figure 16:
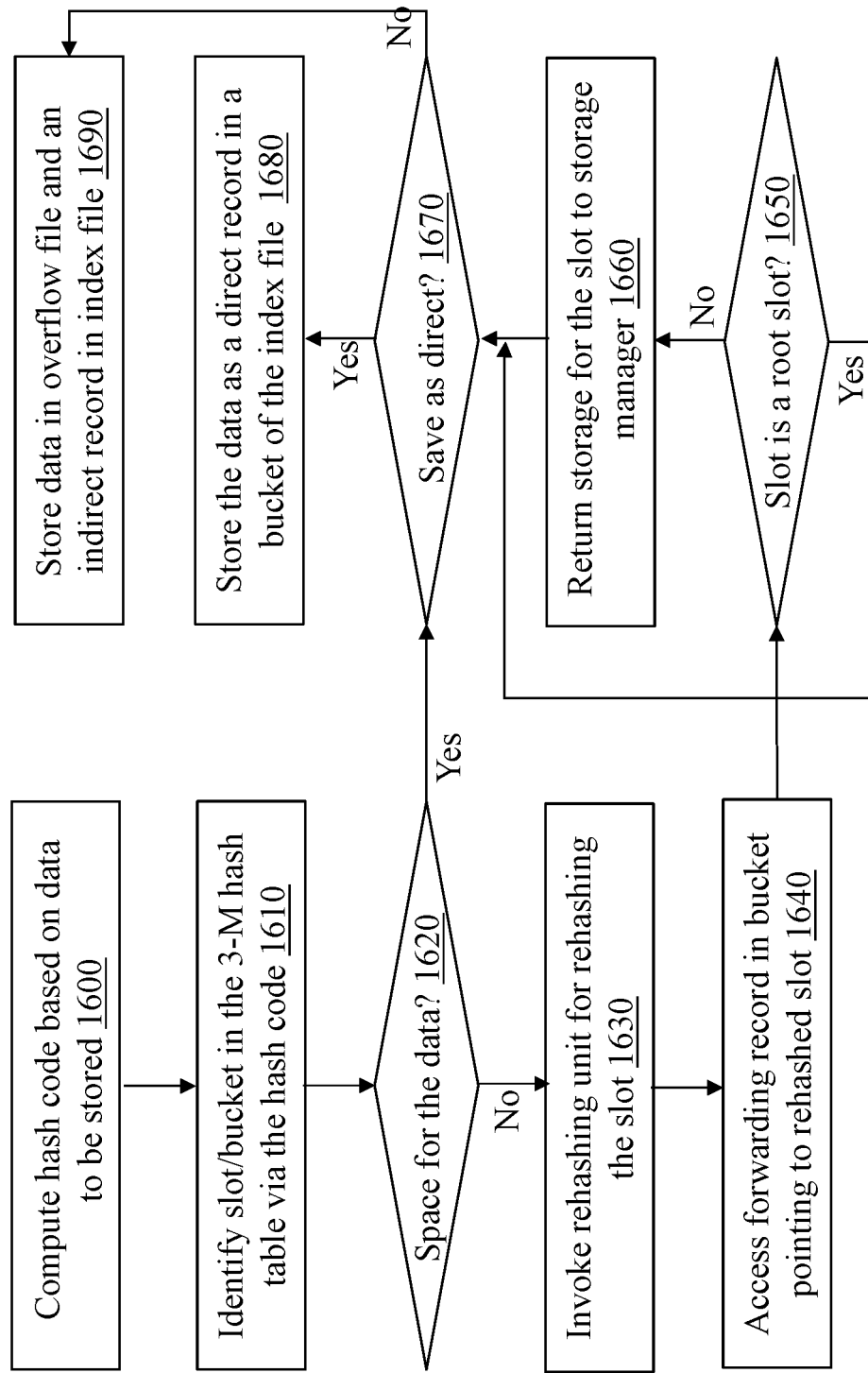
FIG. 16 is a flowchart of an exemplary process of a 3-M hash table based data storage unit, in accordance with an exemplary embodiment of the present teaching.

FIG. 16 is a flowchart of an exemplary process of the 3-M HT based data storage unit for storing data into a storage via the 3-M hash table 200, in accordance with an exemplary embodiment of the present teaching. As shown in FIG. 14, upon receiving a request to storing data, the 3-M HT based data storage unit 1220 is invoked to compute, at 1600, a hash code based on the data to be stored. Using the hash code, a slot and a bucket in the 3-M hash table 200 are identified at 1610 and from there a search is performed to locate space for storing the data. If no available space is found, determined at 1620, the 3-M HT base data storage unit 1250 may invoke, at 1630, the 3-M HT slot rehashing unit 1270 to rehash the slot. When a rehashing slot is created, the forwarding record stored in the base slot is accessed, at 1640, and linked to the rehashed slot. In some embodiments, if the slot being rehashed is a base slot, determined at 1650, then the rehashing operation is complete because the base slot contains forwarding records that redirect accesses to the rehashed slot (as indicated in step 1490). However, if the slot being rehashed is not a base slot, then the previous storage used for the slot being rehashed is no longer needed after it has been rehashed, because the base slot is where the forwarding records are stored (as indicated in step 1490). Thus, once such a non-base slot has been rehashed, we can return its previous storage to the storage manager in 1660. Then the 3-M HT based data storage unit 1220 proceeds to handle the data storage request with respect to the rehashed slot.

When space for handling the data storage request is found in a slot, either in the base slot (determined at 1620) or in a rehashed slot (from step 1660), it is further determined, at 1670, whether the data can be stored directly in a bucket in the slot as a direct record. As discussed herein, in some embodiments, if data can be fit into one bucket, they can be saved in the bucket as a direct record. In this situation, the data are stored, at 1680, directly in the bucket of the index file 210 (either in the base slot or in the rehashed slot) as a direct record. If data cannot be fit into one bucket, at step 1690, the 3-M HT based data storage unit 1220 saves the data in the overflow file 240 and then inserts an indirect record in the bucket of the index file to provide a pointer. If the length of data is less than a block, the data are saved in the overflow file 240 as short indirect data and a short indirect record is constructed and stored in the bucket in the index file 210 based on the length of data as well as information about the specific location (block number and offset) in the overflow file 240 where the short data are stored. If the length of data is more than a block, the data are saved in the overflow file 240 as long indirect data and a long indirect record is constructed and stored in the bucket in the index file 210 based on the information about the starting block of where the long indirect data are stored.

Figure 17:
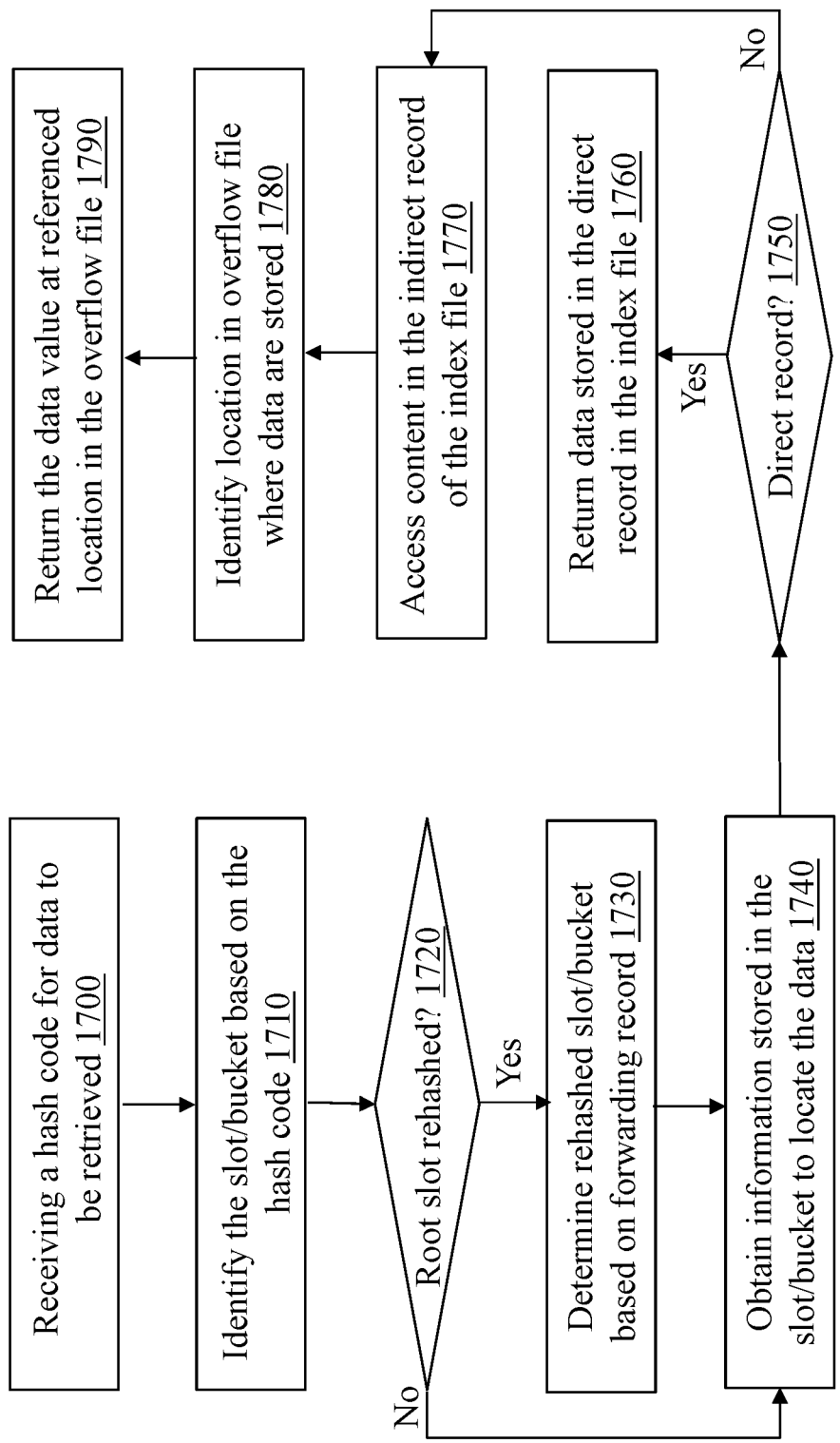
FIG. 17 is a flowchart of an exemplary process of a 3-M hash table based data retrieval unit, in accordance with an exemplary embodiment of the present teaching.

FIG. 17 is a flowchart of an exemplary process of a 3-M hash table based data retrieval unit for retrieving data from a storage managed via the 3-M hash table 200, in accordance with an exemplary embodiment of the present teaching. As illustrated in FIG. 14, when the storage management system 1200 receives a data retrieval request, it invokes the 3-M HT based data retrieval unit 1240. Upon receiving at 1700 a hash code representing the data to be retrieved, the 3-M HT based data retrieval unit 1240 identifies, at 1710, a slot and a bucket mapped to by the hash code. If the bucket of the slot stores a forwarding record, i.e., the base slot has been rehashed, determined at 1720, the 3-M HT based data retrieval unit 1240 determines, at 1730, the rehashed slot and bucket therein according to the content in the forwarding record. If the slot is not rehashed, then the request for data retrieval is processed based on the record stored in the slot/bucket identified based on the hash code.

When the slot and bucket are determined, whether in the base slot or in the rehashed slot, information stored in an index record therein is obtained, at 1740, and used to determine the location of the data to be retrieved. If the index record stored in the bucket indicates, determined at 1750, that it is a direct record, i.e., data to be retrieved are stored directly in the bucket of the slot, then the data value stored in the direct record is returned, at 1760, as a response to the data retrieval request.

If the index record in the bucket is an indirect record, it means that the data to be retrieved are in the overflow file 240 and the content of the indirect record is accessed, at 1770, and used to determine, at 1780, the location in the overflow file 240 where the data are stored. With the mapped location in the overflow file 240, the 3-M HT based data retrieval unit 1240 then returns, at 1790, data value stored at the mapped location.

Figure 18:
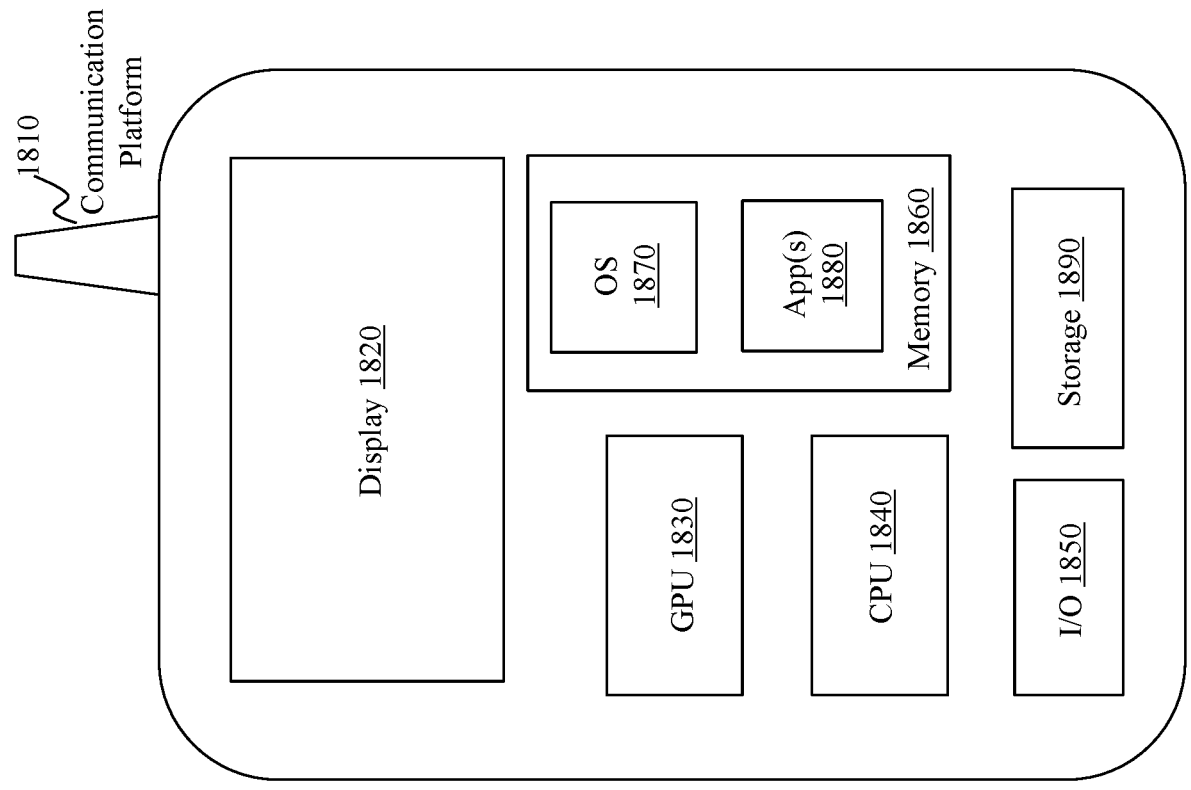
FIG. 18 is an illustrative diagram of an exemplary mobile device architecture that may be used to realize a specialized system implementing the present teaching in accordance with various embodiments.

FIG. 18 is an illustrative diagram of an exemplary mobile device architecture that may be used to realize a specialized system implementing the present teaching in accordance with various embodiments. In this example, the user device on which the present teaching may be implemented corresponds to a mobile device 1800, including, but is not limited to, a smart phone, a tablet, a music player, a handled gaming console, a global positioning system (GPS) receiver, and a wearable computing device, or in any other form factor. Mobile device 1800 may include one or more central processing units ("CPUs") 1840, one or more graphic processing units ("GPUs") 1830, a display 1820, a memory 1860, a communication platform 1810, such as a wireless communication module, storage 1890, and one or more input/output (I/O) devices 1850. Any other suitable component, including but not limited to a system bus or a controller (not shown), may also be included in the mobile device 1800. As shown in FIG. 18, a mobile operating system 1870 (e.g., iOS, Android, Windows Phone, etc.), and one or more applications 1880 may be loaded into memory 1860 from storage 1890 in order to be executed by the CPU 1840. The applications 1880 may include a browser or any other suitable mobile apps for information management according to the present teaching on mobile device 1800. User interactions, if any, may be achieved via the I/O devices 1850 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 19:
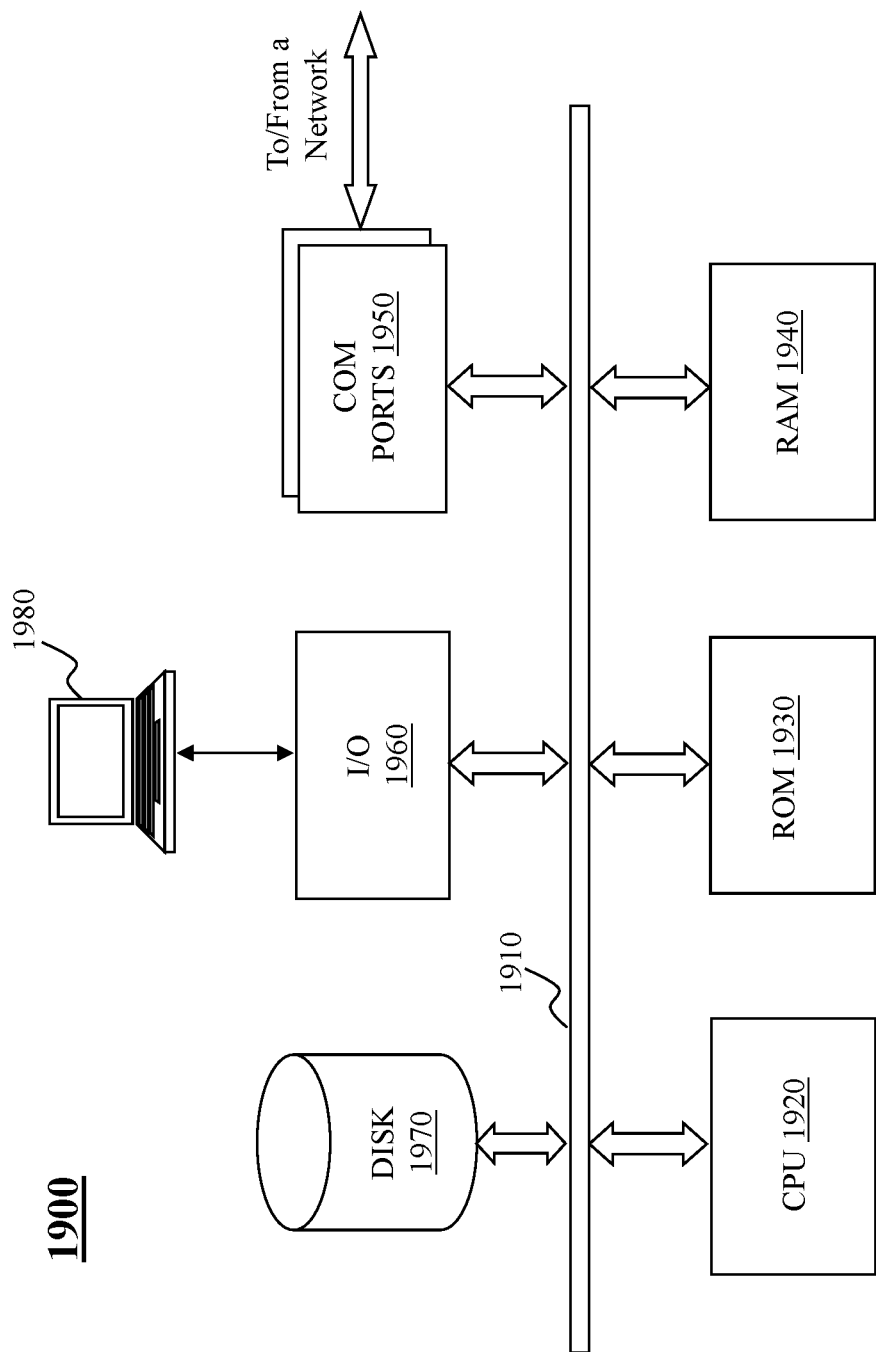
FIG. 19 is an illustrative diagram of an exemplary computing device architecture that may be used to realize a specialized system implementing the present teaching in accordance with various embodiments.

FIG. 19 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1900 may be used to implement any component or aspect of the framework as disclosed herein. For example, the storage management system as disclosed herein may be implemented on a computer such as computer 1900, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1900, for example, includes COM ports 1950 connected to and from a network connected thereto to facilitate data communications. Computer 1900 also includes a central processing unit (CPU) 1920, in the form of one or more processors, for executing program instructions. The exemplary computer platform includes an internal communication bus 1910, program storage and data storage of different forms (e.g., disk 1970, read only memory (ROM) 1930, or random access memory (RAM) 1940), for various data files to be processed and/or communicated by computer 1900, as well as possibly program instructions to be executed by CPU 1920. Computer 1900 also includes an I/O component 1960, supporting input/output flows between the computer and other components therein such as user interface elements 1980. Computer 1900 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A hash table constructed for facilitating data storage and management, comprising:
    an index file, generated by a hash table constructor implemented using a processor, having one or more slots, each of which includes one or more buckets, wherein each of the one or more buckets in each of the one or more slots is configured to stores one or more types of records, wherein
    the one or more types of records include a direct record, an indirect record, and a forwarding record,
    a direct record stores data for subsequent access directly in a bucket of a slot in the index file as direct data which satisfies a first condition,
    an indirect record stores information pointing to a storage location where data for subsequent access is stored, and
    a forwarding record in a slot indicates that the slot has been rehashed.

2. The hash table of claim 1, wherein the one or more slots include at least one base slot.

3. The hash table of claim 2, wherein the one or more slots include at least one rehashed slot, wherein each of the at least one rehashed slot is associated with a corresponding base slot and is created when the corresponding base slot is rehashed.

4. The hash table of claim 3, wherein a forwarding record is stored in at least some of the one or more buckets of a base slot that has been rehashed, pointing to a rehashed slot created for the base slot.

5. The hash table of claim 3, wherein whether rehashing is to be performed is determined, by a hash table slot rehashing unit implemented using a processor, with respect to one or more of the at least one base slot individually or collectively based on corresponding pre-determined criteria.

6. The hash table of claim 1, wherein the direct record specifies a first length of a key and a second length of a value included in the direct data so that storage management for direct data is variable-length enabled.

7. The hash table of claim 1, further comprising an overflow file for storing data indexed by at least some indirect records in the index file.

8. The hash table of claim 7, wherein the storage location pointed to by an indirect record corresponds to a location in the overflow file where indirect data are stored.

9. The hash table of claim 7, wherein an indirect record is one of a short indirect record and a long indirect record.

10. The hash table of claim 9, wherein
    a short indirect record provides information pointing to a location in the overflow file where corresponding short indirect data are stored, wherein the short indirect data satisfy a second condition; and
    a long indirect record provides information pointing to a location in the overflow file where corresponding long indirect data are stored.

11. The hash table of claim 10, wherein
    short indirect data provide information about a first length of a key and a second length of a value included in the short indirect data so that storage management for short indirect data is variable-length enabled; and
    long indirect data provide information about a first length of a key and a second length of a value included in the long indirect data so that storage management for long indirect data is variable-length enabled.

12. The hash table of claim 1, wherein a forwarding record in a slot further stores information pointing to a storage location to which the slot has been rehashed.

* * * * *

UNITED STATES PATENT AND TRADEMARK OFFICE
CERTIFICATE OF CORRECTION

PATENT NO. : 11,254,590 B2
APPLICATION NO. : 17/293974
DATED : February 22, 2022
INVENTOR(S) : Steve Heller It is certified that error appears in the above-identified patent and that said Letters Patent is hereby corrected as shown below:

In the Specification

Column 15, Line 60, should be corrected to read as follows:
Fig. 16 is a flowchart of an exemplary process of the 3-M HT based data storage unit for storing data into a storage via the 3-M hash table 200, in accordance with an exemplary embodiment of the present teaching. As shown in Fig. 14, upon receiving a request to storing data, the 3-M HT based data storage unit 1220 is invoked to compute, at 1600, a hash code based on the data to be stored. Using the hash code, a slot and a bucket in the 3-M hash table 200 are identified at 1610 and from there a search is performed to locate space for storing the data. If no available space is found, determined at 1620, the 3-M HT based data storage unit 1250 may invoke, at 1630, the 3-M HT slot rehashing unit 1270 to rehash the slot. When a rehashing slot is created, the forwarding record stored in the base slot is accessed, at 1640, and linked to the rehashed slot. In some embodiments, if the slot being rehashed is a base slot, determined at 1650, then the rehashing operation is complete because the base slot contains forwarding records that redirect accesses to the rehashed slot (as indicated in step 1540). However, if the slot being rehashed is not a base slot, then the previous storage used for the slot being rehashed is no longer needed after it has been rehashed, because the base slot is where the forwarding records are stored (as indicated in step 1540). Thus, once such a non-base slot has been rehashed, we can return its previous storage to the storage manager in 1660. Then the 3-M HT based data storage unit 1220 proceeds to handle the data storage request with respect to the rehashed slot.

Signed and Sealed this
Twentieth Day of December, 2022

Katherine Kelly Vidal
*Director of the United States Patent and Trademark Office*